(12) United States Patent
Fekih Ahmed et al.

(10) Patent No.: US 11,800,351 B2
(45) Date of Patent: Oct. 24, 2023

(54) MULTI-X KEY CHAINING FOR GENERIC BOOTSTRAPPING ARCHITECTURE (GBA)

(71) Applicant: Telefonaktiebolaget LM Ericsson (publ), Stockholm (SE)

(72) Inventors: Mohamed Fekih Ahmed, Montreal (CA); Rasel Chowdhury, Montreal (CA); Yassine Snoussi, Laval (CA); John Christopher, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 348 days.

(21) Appl. No.: 17/258,572

(22) PCT Filed: Jul. 17, 2018

(86) PCT No.: PCT/IB2018/055303
§ 371 (c)(1),
(2) Date: Jan. 7, 2021

(87) PCT Pub. No.: WO2020/016628
PCT Pub. Date: Jan. 23, 2020

(65) Prior Publication Data
US 2021/0274343 A1 Sep. 2, 2021

(51) Int. Cl.
*H04L 9/08* (2006.01)
*H04W 12/033* (2021.01)
(Continued)

(52) U.S. Cl.
CPC .......... *H04W 12/033* (2021.01); *G06F 21/62* (2013.01); *H04L 9/0847* (2013.01);
(Continued)

(58) Field of Classification Search
CPC . H04W 12/06; H04W 12/033; H04W 12/043; H04W 12/0431; H04W 12/08; H04W 8/18; H04L 63/062; H04L 9/0847
See application file for complete search history.

(56) References Cited

U.S. PATENT DOCUMENTS 6,199,161 B1 * 3/2001 Ahvenainen ...... H04W 12/0433
713/168
7,349,538 B2 3/2008 Gentry et al.
(Continued)

FOREIGN PATENT DOCUMENTS

CN 1977514 A 6/2007
CN 105144656 A 12/2015
(Continued)

OTHER PUBLICATIONS

"Advantages and Disadvantages of Certificate Authentication", SSH Tectia® Server 5.5 for IBM z/OS; https://www.ssh.com/manuals/server-zosproduct/55/ch06s03s05.html, Mar. 19, 2018, pp. 1-3.
(Continued)

*Primary Examiner* — Eric W Shepperd
(74) *Attorney, Agent, or Firm* — SAGE PATENT GROUP

(57) ABSTRACT

Exemplary methods for facilitating secure communication between a mobile network subscriber and various service providers (SPs), the subscriber being associated with a plurality of entities comprising any combination of devices and profiles. Some embodiments can include: obtaining a security identifier associated with the subscriber; based on the security identifier, establishing an identity hierarchy comprising the plurality of entities associated with the subscriber; based on the security identifier, establishing consents for SPs to access data generated by the entities of the identity hierarchy; in response to a request comprising the security identifier, receiving a public key usable to encrypt data for sending to a particular SP, the data being
(Continued)

decryptable using a corresponding secret key associated with an established consent for the particular SP; and encrypting the data using the public key and the identity hierarchy. Embodiments also include subscriber devices and server apparatus configurable to perform the exemplary methods.

27 Claims, 20 Drawing Sheets

(51) Int. Cl.
H04W 12/0431 (2021.01)
G06F 21/62 (2013.01)
H04L 9/14 (2006.01)
H04L 9/32 (2006.01)
H04W 12/06 (2021.01)
H04W 12/08 (2021.01)

(52) U.S. Cl.
CPC .............. *H04L 9/0866* (2013.01); *H04L 9/14* (2013.01); *H04L 9/3271* (2013.01); *H04W 12/0431* (2021.01); *H04W 12/06* (2013.01); *H04W 12/08* (2013.01)

(56) References Cited

U.S. PATENT DOCUMENTS

| | | | |
|---|---|---|---|
| 7,480,385 B2 | 1/2009 | Weber | |
| 9,215,076 B1* | 12/2015 | Roth | H04L 9/3247 |
| 2005/0144439 A1* | 6/2005 | Park | H04L 63/06 |
| | | | 713/155 |
| 2007/0038765 A1* | 2/2007 | Dunn | G06F 21/6218 |
| | | | 709/229 |
| 2007/0124578 A1* | 5/2007 | Paya | H04L 63/06 |
| | | | 713/168 |
| 2007/0130465 A1 | 6/2007 | Zeng et al. | |
| 2007/0250713 A1* | 10/2007 | Rahman | H04W 12/50 |
| | | | 713/171 |
| 2010/0057843 A1* | 3/2010 | Landsman | H04L 63/0876 |
| | | | 709/224 |
| 2010/0272260 A1* | 10/2010 | Cao | H04H 60/15 |
| | | | 380/46 |
| 2011/0167142 A1* | 7/2011 | Patel | H04L 41/5045 |
| | | | 718/1 |
| 2012/0144210 A1* | 6/2012 | Yacobi | H04L 9/088 |
| | | | 713/193 |
| 2013/0152208 A1 | 6/2013 | King et al. | |
| 2016/0112208 A1* | 4/2016 | Williams | H04L 9/3268 |
| | | | 713/176 |
| 2016/0286395 A1* | 9/2016 | Adrangi | H04W 12/50 |
| 2020/0177375 A1* | 6/2020 | Buck | H04L 9/0891 |
| 2021/0274343 A1* | 9/2021 | Fekih Ahmed | H04W 12/0431 |

FOREIGN PATENT DOCUMENTS

| | | |
|---|---|---|
| CN | 108063754 A | 5/2018 |
| KR | 101709086 B1 | 2/2017 |
| WO | 2012040198 A1 | 3/2012 |
| WO | 2018021964 A1 | 2/2018 |

OTHER PUBLICATIONS

"Ericsson Mobility Report", https://www.ericsson.com/en/mobility-report/reports, Nov. 2016, pp. 1-36.
"EU General data Protection Regulation", Council of the European Union, Interinstitutional File: 2012/0011 (COD), https://www.eugdpr.org/, Apr. 6, 2016, pp. 1-261.
"Personal Data Protection", Information on the Personal Data Act, http://www.regeringen.se/contentassets/87382a7887764e9995db186244b557e4/personal-data-protection, Oct. 2006, pp. 1-30.
"3GPP TR 36.888 V12.0.0", 3rd Generation Partnership Project; Technical Specification Group Radio Access Network Study on provision of low-cost Machine-Type Communications (MTC) User Equipments (UEs) based on LTE (Release 12), Jun. 2013, pp. 1-55.
Ambrosin, Moreno, et al., "On the Feasibility of Attribute-Based Encryption on Internet of Things Devices", IEEE Micro Special Issue on Internet of Things, 2016, pp. 1-13.
Bethencourt, John, et al., "Ciphertext-Policy Attribute-Based Encryption", Security and Privacy, SP'07, IEEE Symposium, 2007, pp. 1-15.
Boneh, D., et al., "Efficient selective-id secure identity-based encryption without random oracles", Advances in Cryptology—EUROCRYPT 2004, C. Cachin and J. L. Camenisch, Eds. Berlin, Heidelberg: Springer Berlin Heidelberg, 2004, pp. 223-238.
Boneh, D., et al., "Hierarchical identity-based encryption with constant size ciphertext", Advances in Cryptology—EUROCRYPT 2005, R. Cramer, Ed. Berlin, Heidelberg: Springer Berlin Heidelberg, 2005, pp. 440-456.
Borgh, Joakim, et al., "Employing Attribute-Based Encryption in Systems with Resource Constrained Devices in an Information-Centric Networking Context", Global Internet of Things Summit (GIoTS), IEEE, 2017, pp. 1-6.
Chai, Qi, et al., "Verifiable Symmetric Searchable Encryption For Semi-honest-but-curious Cloud Servers", Communications (ICC), IEEE, 2012, pp. 1-6.
Chowdhury, Rasel, et al., "Attribute-Based Encryption for Preserving Smart Home Data Privacy", International Conference on Smart Homes and Health Telematics, 2017, pp. 185-197.
Daniel, Renu Mary, et al., "Analysis of hierarchical identity based encryption schemes and its applicability to computing environments", Journal of Information Security and Applications 36, 2017, pp. 20-31.
Doukas, Charalampos, et al., "Enabling Data Protection through PKI encryption in IoT m-Health Devices", IEEE 12th International Conference on BioInformatics and BioEngineering. Larnaca, Cyprus, Nov. 11-13, 2012, pp. 1-29.
Gentry, C., et al., "Hierarchical id-based cryptography", Advances in Cryptology—ASIACRYPT 2002, Y. Zheng, Ed. Berlin, Heidelberg: Springer Berlin Heidelberg, 2002, pp. 548-566.
Gilman, Evan, et al., "Zero Trust Networks", O'Reilly Media; https://books.google.ca/books?id=mT8gvgAACAAJ, 2017, pp. 1-424.
Goyal, V., et al., "Attribute-based encryption for fine-grained access control of encrypted data", Proceedings of the 13th ACM conference on Computer and communications security, 2006, pp. 89-98.
Horwitz, J., et al., "Toward hierarchical identity-based encryption", Advances in Cryptology—EUROCRYPT 2002, L. R. Knudsen, Ed. Berlin, Heidelberg: Springer Berlin Heidelberg, 2002, pp. 466-481.
Lewko, A., et al., "Unbounded hibe and attribute-based encryption", Annual International Conference on the Theory and Applications of Cryptographic Techniques. Springer, 2011, pp. 547-567.
Liu, Jianghua, et al., "Secure sharing of Personal Health Records in cloud computing: Ciphertext-Policy Attribute-Based Signcryption", Future Generation Computer Systems 52, 2015, pp. 67-76.
MacDonald, John, "Authentication Considerations for Mobile e-health Applications", 2008 Second International Conference on Pervasive Computing Technologies for Healthcare, Jan. 2008, pp. 64-67.
Mahmoody, M., et al., "On the power of hierarchical identity-based encryption", Advances in Cryptology—EUROCRYPT 2016, M. Fischlin and J.-S. Coron, Eds. Berlin, Heidelberg: Springer Berlin Heidelberg, 2016, pp. 243-272.
Moore, Susan, "Gartner Says Worldwide Information Security Spending Will Grow 7 Percent to Reach $86.4 Billion in 2017", https://www.gartner.com/en/newsroom/press-releases/2017-08-16-gartner-says-worldwide-information-security-spending-will-grow-7-percent-to-reach-86-billion-in-2017, Aug. 16, 2017, pp. 1-3.
Morgan, Si Eve, "2017 Cybercrime Report", Cybersecurity Ventures, Herjavec Group, https://cybersecurityventures.com/2015-wp/wp-content/uploads/2017/10/2017-Cybercrime-Report.pdf, 2017, pp. 1-14.
Morsy, Mohamed Al, et al., "An Analysis of the Cloud Computing Security Problem", https://arxiv.org/ftp/arxiv/papers/1609/1609.01107.pdf, 2016, pp. 1-4.

(56) References Cited

OTHER PUBLICATIONS

Prinzlau, Mauricio, "6 security risks of enterprises using cloud storage and file sharing apps", https://digitalguardian.com/blog/6-security-risks-enterprises-using-cloud-storage-and-file-sharing-apps, Jan. 3, 2019, pp. 1-8.

Ring, J., et al., "A new authentication mechanism and key agreement protocol for sip using identity-based cryptography", AusCERT2006 R&D Stream; Information Security Institute, Queensland University of Technology, 2006, pp. 57-72.

Sethi, Mohit, et al., "Secure and Low-Power Authentication for Resource-Constrained Devices", 5th International Conference on the Internet of Things (IOT), Oct. 2015, pp. 30-36.

Shanmugam, Murugaraj, et al., "Enabling Secure Mobile Access for Electronic Health Care Applications", 2006 Pervasive Health Conference and Workshops, Nov. 2006, pp. 1-8.

Targali, Yousif, et al., "Seamless Authentication Across Heterogeneous Networks using Generic Bootstrapping Systems", IEEE, 9th International Wireless Communications and Mobile Computing Conference (IWCMC), Jul. 2013, pp. 137-142.

"FTC Privacy and Data Security", https://www.ftc.gov/reports/privacy-data-security-update-2016, 2016.

Van Thanh, Do, et al., "Simple strong authentication for internet applications using mobile phones", IEEE GLOBECOM 2008—2008 IEEE Global Telecommunications Conference, Nov. 2008, pp. 1-5.

Xing, Qianqian, et al., "Unbounded and revocable hierarchical identity-based encryption with adaptive security, decryption key exposure resistant, and short public parameters", IEEE 18th International Conference on High Performance Computing and Communications, 2016, pp. 1-76.

Yao, Xuanxia, et al., "A lightweight attribute-based encryption scheme for the Internet of Things", Future Generation Computer Systems 49, 2015, pp. 104-112.

First Chinese Office Action for Chinese Patent Application No. CN 201880095732.X dated Nov. 2, 2022, 7 pages (including English translation).

Jancic, A., et al.; "Pki—advantages and obstacles"; School of Information Systems, Faculty of Business and Law, Deakin University; Jan. 2004; pp. 104-114.

\* cited by examiner

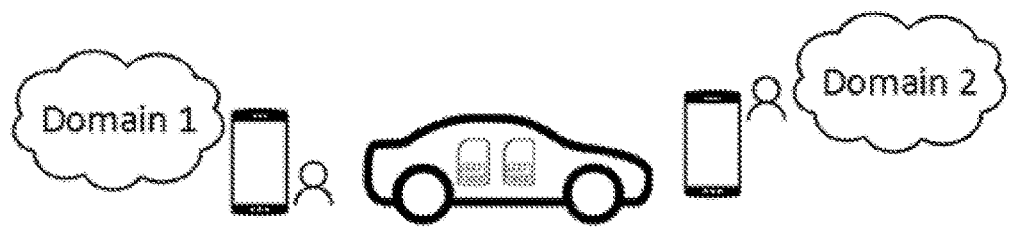
FIG. 4
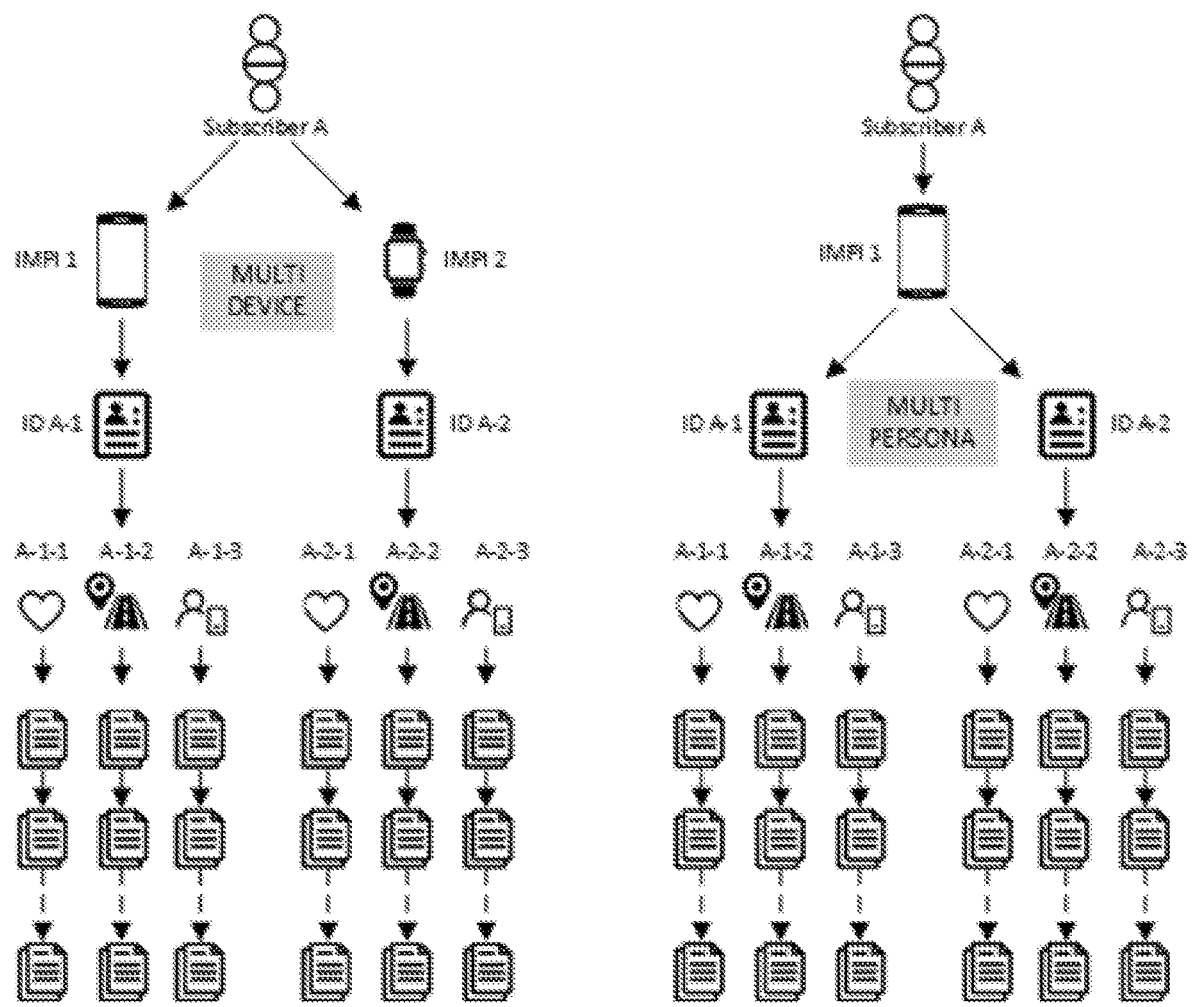
FIG. 6          FIG. 7

MULTI-X KEY CHAINING FOR GENERIC BOOTSTRAPPING ARCHITECTURE (GBA)

TECHNICAL FIELD

The present application relates generally to the fields of data security, data encryption, and data privacy, and, more specifically, to apparatus, methods, and computer-readable media that provide end-to end security, encryption, identity management, and key management in a multi-device, multi-persona, multi-user, and/or multi-domain (collectively referred to as "multi-x") environment.

BACKGROUND

Cyber-physical system (CPS) is often used to refer to a physical system that is controlled and/or monitored by computer-based algorithms, tightly integrated with the Internet and its users. In CPS, physical and software components can be deeply intertwined, each operating on different spatial and temporal scales, exhibiting multiple and distinct behavioral modalities, and interacting with each other in various ways that can change with context. Examples of CPS include cloud computing systems (CCS), smart grid systems, medical monitoring, autonomous vehicle systems, process control systems, robotics, and automated-pilot avionics.

Machine to Machine (M2M) communication—also referred to as Machine Type Communication (MTC)—represents a significant growth opportunity for the 3GPP ecosystem. To support this so-called "Internet of Things" (IoT), 3GPP (3rd Generation Partnership Project) operators must address usage scenarios with devices that are power-efficient (e.g., battery life of several years), can be reached in challenging coverage conditions (e.g., indoor and basements), and are cost-effective so that they can be deployed on a mass scale and even be disposable. A further requirement on the 3GPP IoT ecosystem is support for a large number of MTC or M2M devices, each generating a small amount of data. At cell level in a network, it is expected that each household in a cell may have up to 40 MTC devices with a household density per cell according to the assumptions in Annex A of 3GPP TR 36.888.

Deployment of fifth-generation (5G) mobile networks is on the near horizon and IoT is expected to form major portion of this 5G wireless system. IoT are expected to drastically change various industries by supplying a greatly increased volume of data that the network and data storage frameworks will be required to handle. According to a recent survey [1], IoT will generate around 600 ZB (Zettabyte) of data by 2020, which is around 275% more generated data compared to 2016. In this data-rich environment, it will become increasingly important to ensure that service providers are respecting data privacy regulations and preventing hackers from taking control of devices, compromising information, disrupting services, or even taking down entire networks of crucial devices. However, the requirements for data encryption and access control for this amount or scale of data are extremely challenging.

In addition to the massive scale of connected end terminals and the data they are expected to generate, new technologies of Multi-X devices make identity and access managements more complex while bringing new security and privacy challenges. As used herein, "multi-X" refers to support of one or more of: multi-persona, multi-user, multi-device, and/or multi-domain. FIG. 1 shows an exemplary multi-device scenario, in which a user maintains multiple devices under a single subscription profile and/or telephone number. Each device utilizes a SIM (Subscriber Identification Module), Non-SIM Non-Subscriber Identity Module), or eSIM (embedded-SIM) containing information from which the subscriber's network identity is derived, and that must be physically loaded onto the particular device in use. As shown in FIG. 1, one exemplary single-subscriber, multi-device scenario involves a smartphone, smartwatch, and connected automobile, all operating under a single subscription to a network service provider (e.g., cellular operator).

FIG. 2 shows an exemplary multi-user scenario, in which a single subscription is shared among multiple individuals (e.g., family plan) or a single connected device (e.g., automobile) is shared by multiple users, each having a different subscription. In the latter case, each user has a different identity, which requires the device to have the ability to adapt and switch between user profiles.

FIG. 3 shows an exemplary multi-persona scenario, in which a single device can host multiple "personas" (also referred to as "virtual environments" or "virtual devices") that are securely separated from each other. For example, a particular device can host multiple personas of a single subscriber (e.g., personal and business personas) while maintaining a single subscription identity from a network access perspective. As another example, a particular device can host personas associated with different subscribers. FIG. 4 shows an exemplary multi-domain scenario, in which users from different domains can share a single device under different subscription identities. Like the other exemplary scenarios mentioned above, security of the data of the individual users is critically important.

These multi-X scenarios can add significant complexity to both identity and access management. Moreover, the massive volume of data generated by these devices requires an efficient solution for managing encryption and decryption (e.g., keys) to avoid bottlenecks. For example, single key encryption and decryption can be more efficient than multiple time-based keys without any hierarchy or identity logic, each key applied to some small number of data packets over a few seconds interval.

Further new mechanisms for data access control will also be necessary to avoid untrusted access or control over critical data. In other words, protection of personal data becomes even more important in this environment, particularly in view of various laws, regulations, and requirements promulgated globally by various authorities. The European Union (EU) has formulated and planned to implement and enforce a new General Data Protection Regulation (GDPR) on May 25, 2018. GDPR is anticipated to protect the export of personal data within and outside the EU. The U.S. Federal Trade Commission (FTC) is also investigating similar regulations. Moreover, the Swedish Personal Data Act (Personuppgiftslagen or PuL) defines similar regulations. In general, all of these regulations impose additional requirements such that service providers cannot collect personal information that is not required, and data collection, storage, and processing must be secure. Users are responsible for identifying which data can be collected, and a service provider has the right to retain information only for a limited period of time. The success and future development of 5G and IoT will likely depend on the ability of service provides to adopt and comply with these regulations.

Currently, public key infrastructure (PKI) is often used to manage encryption keys. PKI includes roles, policies, and procedures in order to create, manage, distribute, use, store, and revoke digital certificates and manage public-key encryption. One primary drawback is that PKI requires large infrastructure (e.g., Certifying Authorities, Registration Authorities, Repository, Archives and End Entity) to manage and maintain the certificates used. In addition, PKI is generally non-scalable (e.g., due to its centralized configuration) and does not include provisions for user consents, which makes it easier to compromise.

In similar context, the Generic Bootstrapping Architecture (GBA) is a technology for user authentication. As standardized by 3GPP, GBA authenticates end devices to connect users' applications to the network. It uses Authentication Key Agreement protocol (AKA) rather than PKI. With GBA, keys are not shared between a Bootstrapping Server Function (BSF) and the device, but only some parameters to derive the key. Nonetheless, current GBA architecture has several drawbacks. First, it provides only end-to-end (E2E) security connection. Moreover, the key database is encrypted but the not the data itself. Also, GBA requires users to be involved to decide what should be encrypted and to maintain the keys and share them for decryption. In addition to the general constraints discussed above, GBA has various drawbacks that are particular to multi-X scenarios and/or applications.

SUMMARY

Exemplary embodiments of the present disclosure address these and other challenges by providing confidential, secure end-to-end communications throughout a network via a flexible, scalable, single-key encryption/decryption management solution. Exemplary embodiments can fulfill newly imposed privacy regulations, enabling users, operators, and application/service providers to leverage the full power of IoT and multi-X, while providing new access control solutions for identity and access management.

More specifically, exemplary embodiments of the present disclosure provide end-to-end security and key chaining encryption for Multi-X with identity and key management by extending the Generic Bootstrapping Architecture (GBA). By providing a flexible and scalable single-key encryption/decryption management solutions, exemplary embodiments can fulfill the massive encryption requirements of IoT and multi-X scenarios, while providing new access control solutions for secure handling of generated and communicated data in view of the new privacy regulations.

Certain exemplary embodiments include methods and/or procedures, performed by a subscriber device, for facilitating secure communication between a subscriber to a mobile communication network and one or more service providers (SPs), wherein the subscriber is associated with a plurality of entities comprising any combination of devices and profiles. The exemplary methods and/or procedures can include obtaining a security identifier (ID) associated with the subscriber. The exemplary methods and/or procedures can also include, based on the security ID, establishing an identity hierarchy comprising the plurality of entities associated with the subscriber. The exemplary methods and/or procedures can also include, based on the security ID, establishing consents for one or more SPs to access data generated by the entities included in the identity hierarchy. The exemplary methods and/or procedures can also include, in response to a request comprising the security ID, receiving a public key (PK) usable to encrypt data for sending to a particular SP, wherein the data is decryptable using a corresponding secret key (SK) associated with an established consent for the particular SP. The exemplary methods and/or procedures can also include encrypting the data using the PK and the identity hierarchy.

Other exemplary embodiments include methods and/or procedures, performed by a server, for facilitating secure communication between a subscriber to a mobile communication network and one or more service providers (SPs), wherein the subscriber is associated with a plurality of entities comprising any combination of devices and profiles. The exemplary methods and/or procedures can include performing an authentication key agreement (AKA) with a subscriber device. The exemplary methods and/or procedures can also include deriving and storing a bootstrap identifier (BTID) and a plurality of keys associated with the BTID. The exemplary methods and/or procedures can also include sending the BTID to the subscriber device. The exemplary methods and/or procedures can also include receiving a first request for a first key of the plurality, wherein the first request comprises an associated BTID. The exemplary methods and/or procedures can also include, based on determining that the associated BTID matches the stored BTID, sending the first key in response to the first request.

Other exemplary embodiments include methods and/or procedures, performed by a server, for facilitating secure communication between a subscriber to a mobile communication network and one or more service providers (SPs), wherein the subscriber is associated with a plurality of entities comprising any combination of devices and profiles. The exemplary methods and/or procedures can include receiving, from the subscriber device, a request comprising a security identifier (ID) associated with the subscriber. The exemplary methods and/or procedures can also include, based on the security ID, establishing an identity hierarchy comprising the plurality of entities associated with the subscriber. The exemplary methods and/or procedures can also include generating a public key (PK) associated with the subscriber. The exemplary methods and/or procedures can also include generating a hierarchy of secret keys (SKs) corresponding to the identity hierarchy. The exemplary methods and/or procedures can also include providing the PK to a particular device or profile included in the identity hierarchy.

Other exemplary embodiments include methods and/or procedures, performed by a server, for facilitating secure communication between a subscriber to a mobile communication network and one or more service providers (SPs), wherein the subscriber is associated with a plurality of entities comprising any combination of devices and profiles. The exemplary methods and/or procedures can include receiving, from the subscriber device, a request comprising a security identifier (ID) associated with the subscriber. The exemplary methods and/or procedures can also include authenticating the subscriber based on subscriber information associated with the security ID. The exemplary methods and/or procedures can also include sending, to the subscriber device, a list of entities, comprising any combination of devices and profiles, associated with the subscriber. The exemplary methods and/or procedures can also include receiving, from the subscriber device, consents for one or more service providers (SPs) to access data generated by the entities included in the list. The exemplary methods and/or procedures can also include mapping the received consents into an identity hierarchy comprising the entities associated with the subscriber.

Other exemplary embodiments include subscriber devices (e.g., user equipment or UE) and server apparatus comprising communication transceivers, processor(s), and memory (ies) storing computer-executable instructions that, when executed by the processor(s), configure the subscriber device or the server apparatus to perform operations corresponding to any of the exemplary methods and/or procedures disclosed herein Other exemplary embodiments include non-transitory, computer-readable media storing program instructions that, when executed by a subscriber device or a server apparatus, configure the subscriber device or the server apparatus to perform operations corresponding to any of the exemplary methods and/or procedures disclosed herein.

Of course, embodiments of the present disclosure are not limited to the above features and advantages. Indeed, those skilled in the art will recognize additional features and advantages upon reading the following detailed description, and upon viewing the accompanying Figures.

BRIEF DESCRIPTION OF THE DRAWINGS

The following Figures illustrate various exemplary aspects of embodiments disclosed herein:

FIG. 4 shows an exemplary multi-domain scenario, in which users from different domains can share a single device under different subscription identities;

FIG. 6 further illustrates how multiple devices can be associated with a single subscriber or user, according to various exemplary embodiments of the present disclosure;

FIG. 7 further illustrates how multiple personas can be associated with a single subscriber/user and single device, according to various exemplary embodiments of the present disclosure;

Figure 1:
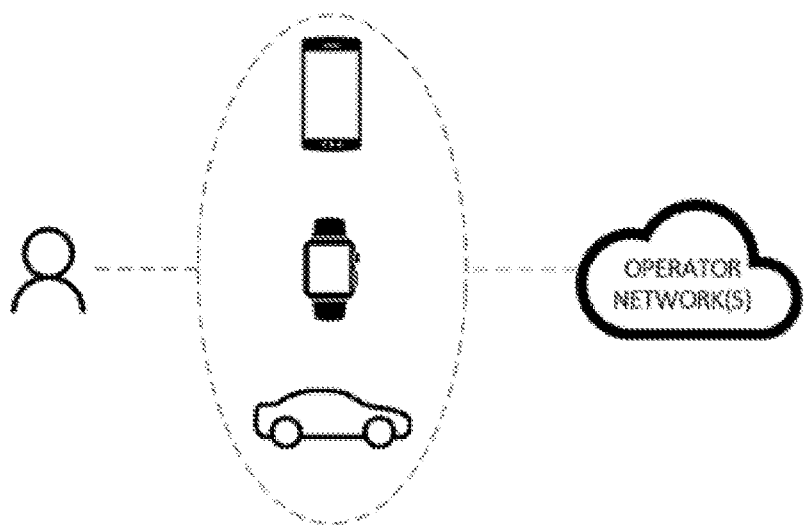
FIG. 1 shows an exemplary multi-device scenario, in which a user maintains multiple devices under a single subscription profile and/or telephone number.
Figure 2:
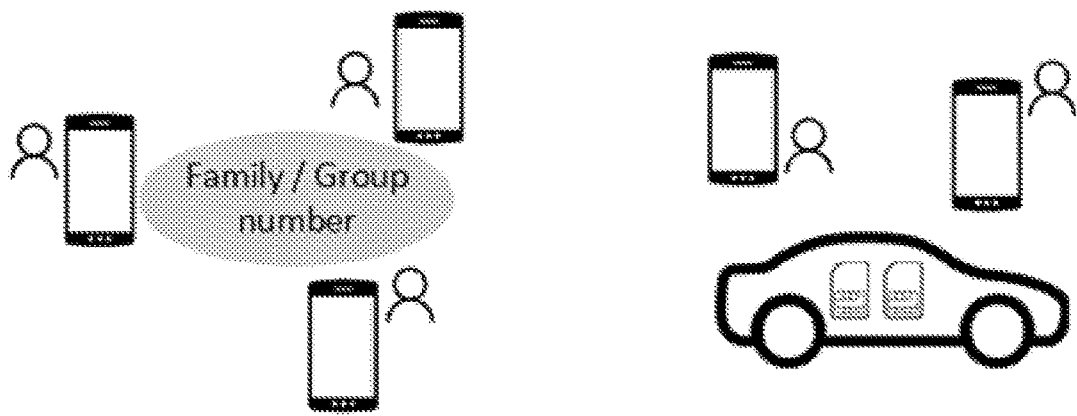
FIG. 2 shows an exemplary multi-user scenario, in which a single subscription is shared among multiple individuals (e.g., family plan) or a single connected device (e.g., automobile) is shared by multiple users.
Figure 3:
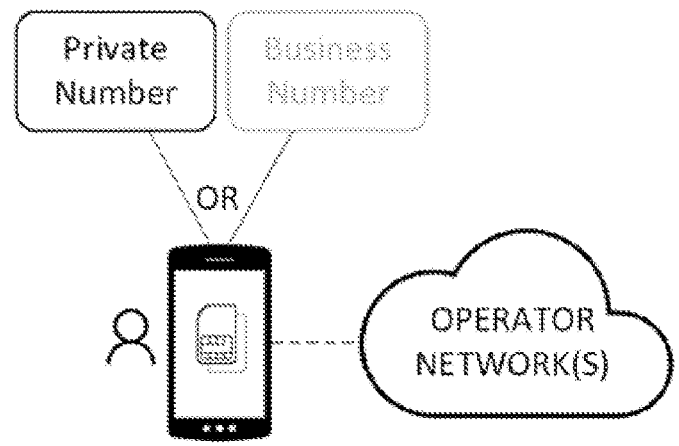
FIG. 3 shows an exemplary multi-persona scenario, in which multiple "personas" of a single individual can each be associated with a different profile on a single device.

While the present disclosure will now be described in detail with reference to the figures, it is done so in connection with the illustrative embodiments and is not limited by the particular embodiments illustrated in the figure(s) or in the appended exemplary embodiments.

DETAILED DESCRIPTION

In addition to the general constraints discussed above, GBA has various drawbacks that are particular to multi-X scenarios and/or applications. For example, GBA requires generation of multiple keys for multi-X, has no hierarchy for sub-keys generation, and assigns keys only for specific time periods. Such massive encryption with multiple keys creates in turns scalability bottleneck and inefficiency, as well as very complex data access control and trust data management. Further, GBA provides no mechanisms to generate a specific key for each service provider nor to decrypt massive data encrypted by different keys.

Nevertheless, various works have been built on top of GBA, focusing on the infrastructure and efficiency of the protocol. Sethi et al. [7] described in their proposition how to employ GBA to ensure secure authentication and communications among resource-constrained devices, while ID-based authentication has been proposed by Ring et al. [8]. A GBA-based approach employing token-based authentication incorporated in the BSF has been proposed to transfer Electronic Health Records through mobile network [9]. This approach allows authentication, prevents token masquerading, and provides confidentiality and resistance to man-in-the-middle attacks while working with trusted service provider.

Similarly, dynamic generation of credentials using Federated Identity reverse bootstrapping mechanism has been proposed for secure and seamless access across heterogeneous network [10]. This approach used an application-layer bootstrapping mechanism to facilitate network access layer credential generation seamlessly and automatically. Afterwards, the credential is used for One-Round-Trip EAP (Extensible Authentication Protocol)-Authentication which enables authentication on new networks. Experiments demonstrated the efficiency of the work with respect to the authentication procedure, keying material, cost of deployment, and other criteria.

Other works discuss existing authentication solutions and their limitations (e.g., ISIM (Integrated Subscriber Identity Module) authentication, GBA, and SIM Strong authentication using SMS (Short Message Service) verification), as well as SIM authentication based on different scenarios like SATSA (Security and Trust Services APIs) and EAP-SIM (Extensible Authentication Protocol-Subscriber Identity Module), Bluetooth, and SIM dongle [11]. In addition, various concerns regarding the privacy and cost sensitive applications in e-health sector have been identified [12]. For example, in the 3GPP GBA framework, the mobile operator is always assumed to be trusted, but due to the security risk of e-health sector the trusted BSF should be eliminated. An alternative solution for GBA that satisfies the e-health requirements using AKA scheme and by building on the dual capabilities of SMS Security and USIM (Universal Subscriber Identity Module) Application Toolkit (SAT). More specifically, another set of keys is generated in USIM as well as in an e-health server.

None of these works address multi-identity, multi-persona, multi-domains, and access control. Moreover, none fulfill the coming regional and global regulations such as GDPR, FTC and PDA (Personal Data Act). These regulations will have a high impact on the increasingly sophisticated technology of 5G and IOT evolution where the security and the protection of personal data become one of the main design requirements. In the context of security, many encryption-based access control schemes have been proposed and adopted in IoT domain.

For example, PKI has been proposed to resolve security issues for IoT gateways that aggregate health sensor data through digital certificates and PKI data encryption [13]. PKI model uses a pair of mathematically related keys. If one key is used to encrypt information, then only the related key can decrypt that information. In case the public key gets compromised, still it is not computationally feasible to retrieve the private key. However, it relies on a trusted authority in order to perform the encryption and decryption activities.

Another encryption-based access control scheme called Hierarchical Identity Based Encryption (HIBE) has been proposed ([14]-[15]). HIBE is collision-resistant, and secure against chosen-ciphertext attacks. The message and complexity of encryption and decryption grows linearly with the number of levels in the hierarchy. This scheme is an extension of Boneh-Franklin identity-based encryption (IBE) scheme. In general, IBE is a public key system where the public key can be an arbitrary string such as an email address. A central authority uses a master key to issue private keys to identities that request them. HIBE is a generalization of IBE that mirrors an organizational hierarchy. An identity at level k of the hierarchy tree can issue private keys to its descendant identities, but cannot decrypt messages intended for other identities.

In other words, HIBE utilizes a root key to generate the lower level keys which have IDs incorporated into them. The message is encrypted with ID-tuple. Various works ([16]-[17]) have proposed constant size ciphertext, leading to lower decrypting complexity, history-free updates, security against insiders, and resistance to decryption key exposure. HIBE includes seven different algorithms: setup, key generation, key update, key derivation, encrypt, decrypt, and key revocation. Various other works ([18]-[21]) have explored various aspects of HIBE, but none have taken into consideration the specific requirements of multi-X use cases, including automotive use cases.

Attribute-based encryption is another type of public-key encryption in which the secret key of a user and the ciphertext are dependent upon user attributes (e.g., the country in which they live, or the kind of subscription they have). In such a system, the decryption of a ciphertext is possible only if the set of attributes of the user key matches the attributes of the ciphertext. ABE has been used for fine-grained access control of encrypted data [22]. Nevertheless, due to its public-key nature, ABE (Adaptive Backhaul Equipment) relies on a trusted authority in order to perform the encryption and decryption activities.

None of the previous solutions discussed above are suitable for meeting all of the requirements of multi-X use cases in the context of massive amounts of data and the regulations imposed for secure data collection, storage and processing. In this environment, meeting security, authentication, and authorization requirements becomes critically challenging. Nevertheless, exemplary embodiments of the present disclosure address these challenges by providing secure end-to-end communications throughout a network via a flexible, scalable, single-key encryption/decryption management solution. Exemplary embodiments can fulfill the newly imposed privacy regulations, enabling users, operators, and application providers to leverage the full power of IoT and Multi-X, while providing new access control solutions for identity and access management.

More specifically, exemplary embodiments of the present disclosure provide end-to-end security and key chaining encryption for Multi-X with identity and key management by extending the Generic Bootstrapping Architecture (GBA). By providing a flexible and scalable single-key encryption/decryption management solutions, exemplary embodiments can fulfill the massive encryption requirements of IoT and multi-X scenarios, while providing new access control solutions for secure handling of generated and communicated data in view of the new privacy regulations.

Even more specifically, exemplary embodiments provide hierarchical classification of devices based on the subscriber/user using the information from the Mobile Network Operator (MNO). The device IDs are further extended using time-based identities, thereby facilitating better access control. Exemplary embodiments use a key from GBA to generate an encryption parameter, and a single key for encryption and decryption. The single-key encryption/decryption allows access control and authorization, and consent is provided by the subscriber for the data.

Figure 5:
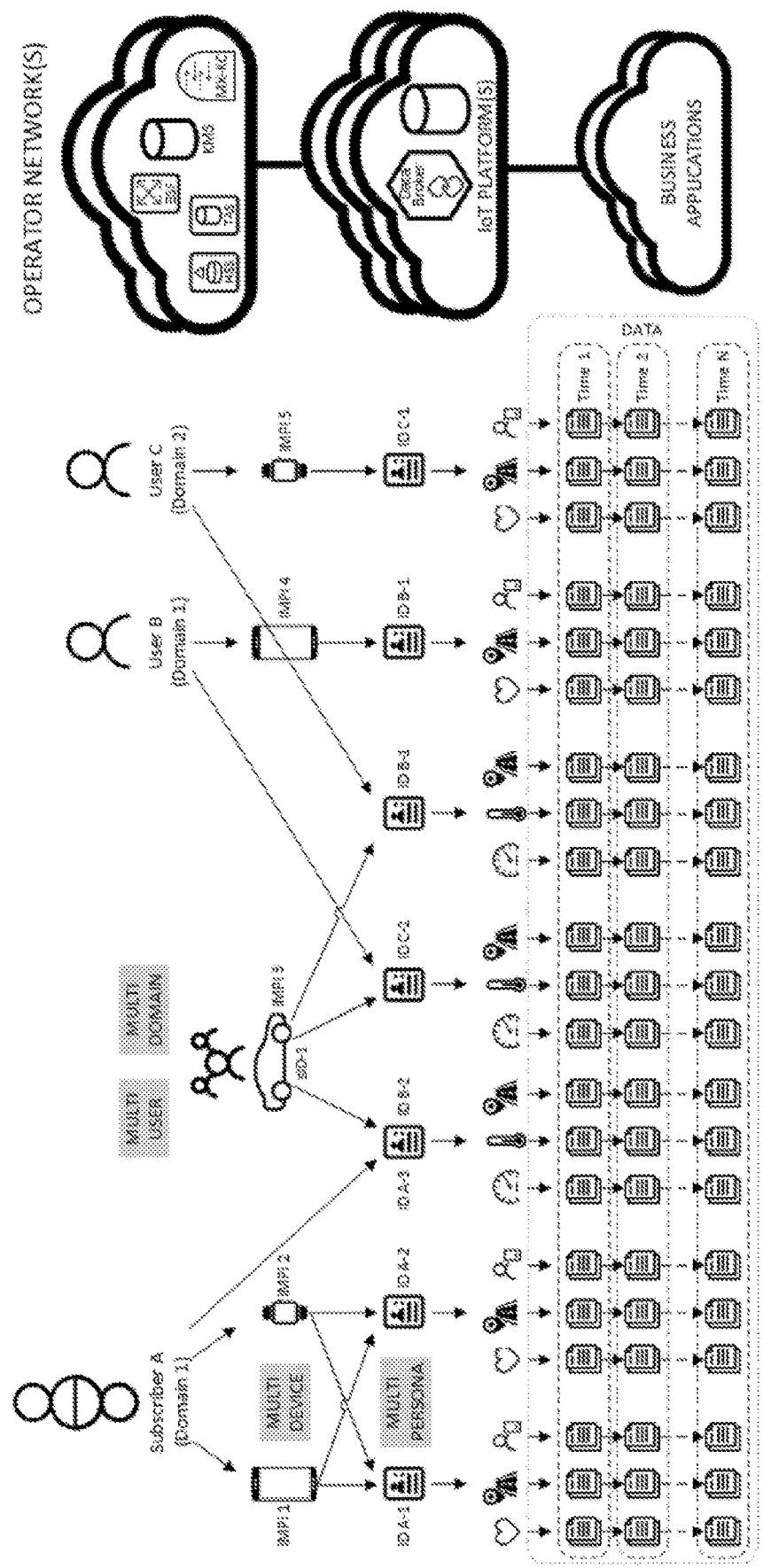
FIG. 5 shows a high-level diagram of a system utilizing GBA architecture and hierarchical ID-based encryption in multi-X environment, according to exemplary embodiments of the present disclosure.

FIG. 5 shows a high-level diagram of a system utilizing GBA architecture and hierarchical ID-based encryption in multi-X environment, according to exemplary embodiments of the present disclosure. At the top layer (conceptually) are three subscribers/users, labelled subscriber A (referred to as "Sub A"), User B, and User C. As shown, Sub A and User B are part of Domain 1, while User C is part of Domain 2. At the next layer are various exemplary devices, labeled Internet Protocol Multimedia Subsystem Private User Identity IMPI1-5. For example, IMPI1 and IMPI2 represent two devices associated with a single subscriber (Sub A). IMPI1 can represent a smartphone and IMPI2 a smartwatch and/or personal fitness tracker. Similarly, IMPI3 can represent an automobile (e.g., car) that is shared by multiple users. At the next level are various profiles on particular devices, each profile associated with a particular top-level subscriber, user, or user "persona." Below each profile are device applications associated with the profile, and below each application is a time-series of data generated by the application as instances 1, 2, . . . N.

FIG. 6 further illustrates how multiple devices can be associated with a single subscriber or user, according to various exemplary embodiments of the present disclosure. As shown in the figure, devices utilize a hierarchical ID with the subscriber at the root. For example, the heart monitor application of profile A-1 (e.g., Sub A's profile on the smartphone device) can be identified as "Sub A/A-1/A-1-1". This hierarchical ID allows individual devices (or a particular device profile) to be uniquely identified, which gives the subscriber the ability to narrowly tailor consent for which data can be shared with application/service providers (SP).

FIG. 7 further illustrates how multiple personas can be associated with a single subscriber/user and single device, according to various exemplary embodiments of the present disclosure. As shown in the figure, Sub A uses two profiles or personas on smartphone device IMPI1. These two profiles—labelled ID A-1 and ID A-2—could be for personal and business use, respectively. Each of Sub A's applications will have a unique ID associated with each of Sub A's profiles on IMPI1. For example, the ID for the heart monitor application of profile A-2 will be "Sub A/A-2/A-2-1", while for profile A-1 the unique ID of the same application is "Sub A/A-1/A-1-1."

In some exemplary embodiments, the hierarchical ID arrangement can be further extended to facilitate unique identification of specific time-domain data, thereby providing the subscriber/user the ability to provide consent on individual data segments. For example, the data produced at time T1 by the heart monitor of Sub A, profile A-1 can be identified by the hierarchical ID "Sub A/A-1/A-1-1-T1." Likewise, the data produced at times 1 and time 2 can be identified as "Sub A/A-1/A-1-1-T1/A-1-1-T2," and so on.

Figure 8:
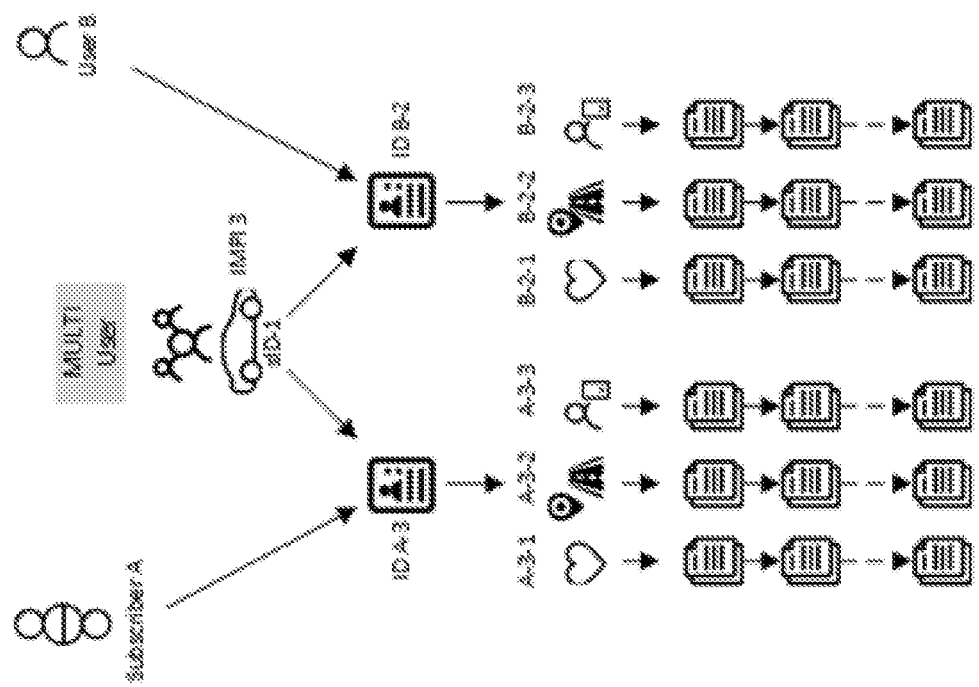
FIG. 8 further illustrates how multiple subscribers or users can be associated with a single device, according to various exemplary embodiments of the present disclosure.

FIG. 8 further illustrates how multiple subscribers or users can be associated with a single device, according to various exemplary embodiments of the present disclosure. When multiple users share a device, the device will adopt a profile associated with the subscriber who is using it. In other words, the physical device will provide multiple "virtual devices," each associated with a profile of a subscriber/user/persona that accesses or uses it. For example, as shown in the figure, the car is divided into a "virtual car" for each subscriber/user/persona accessing it, i.e., profile A-3 of Sub A and profile B-2 of User B. In such case, the hierarchical ID of the car's speedometer as associated with Sub A will be "Sub A/A-3/A-3-1," whereas the hierarchical ID for the same physical speedometer will be "User B/B-2/B-2-1" when associated with User B.

Figure 9:
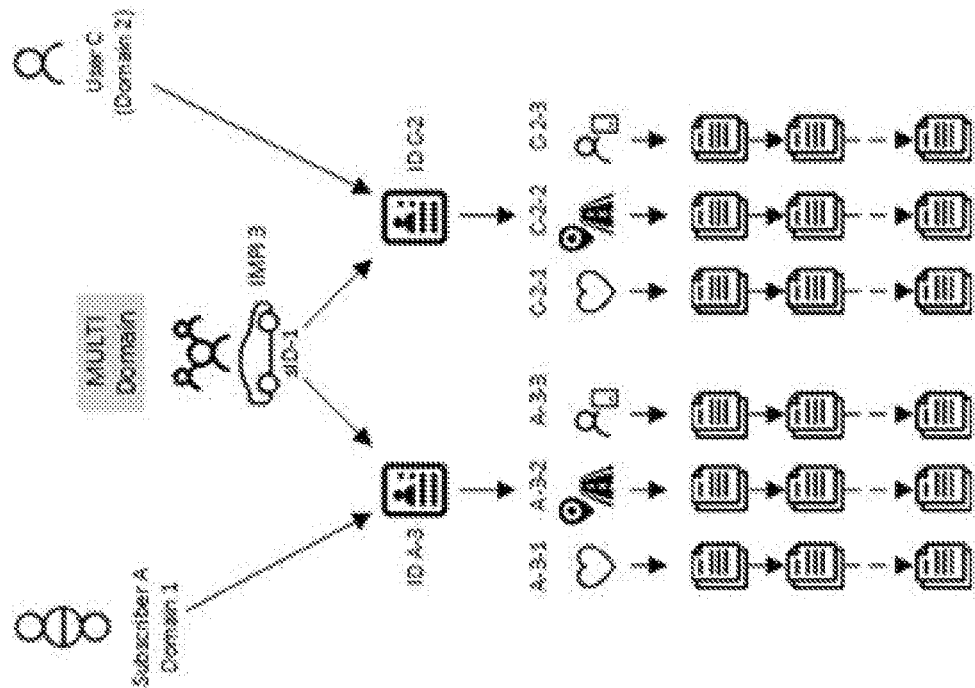
FIG. 9 further illustrates how multiple subscribers or users from different domains can be associated with a single device, according to various exemplary embodiments of the present disclosure.

FIG. 9 further illustrates how multiple subscribers or users from different domains can be associated with a single device, according to various exemplary embodiments of the present disclosure. This scenario is similar to the one shown in FIG. 8, except that Sub A and User C— which share use of automotive device IMPI3—are from different Domains 1 and 2, respectively. For example, Domains 1 and 2 can represent different mobile network operators (MNOs).

In exemplary embodiments, the consent and access control can be achieved by encrypting the data generated from all the devices of the subscribers. Hierarchical IDs provide a parameter for the encryption scheme. More specifically, various embodiments utilize the exemplary hierarchical IDs discussed above with a HIBE encryption scheme, in which a key (called Ks) derived from GBA is used as an input during setup. By combining hierarchical identification and HIBE, it is possible to encrypt the data coming from a device and/or application with the associated hierarchical ID and send it to the service provider (SP). By generating the secret key (SK) based on the hierarchical IDs of the devices and/or applications, the subscriber/user gives consent of which data from which device and/or application that a particular SP can decrypt.

The technique involves the following operations, one or more of which can be used in various exemplary embodiments:

Setup (Ks)→PK, MSK: generates the public key (PK) parameter and master secret key (MSK). The Ks parameter can be derived from GBA bootstrapping and is unique to each subscriber/user, e.g., based on the subscriber's ID information associated with the mobile network.

KeyGen (MSK, ID1)→SK: takes the MSK and ID1 (a hierarchical list of IDs) to generate a secret key (SK) to be used by a particular SP. For example, if Sub A gives consents for data from smartphone, smartwatch heart monitor application, and automobile, the hierarchical ID used to generate SK for the SP is "Sub A/A1/A-2-1/A3."

Encrypt (PK, ID1, M)→CT: takes the Message (M), PK, and the hierarchy level of ID1 that is associated with the particular application and/or device generating the message M, and produces the Cipher Text (CT).

Decrypt (SK, CT)→M: takes SK and CT as input, and based on the access rights of the ID incorporated in SK, a SP will be able to decrypt CT into M.

Figure 10:
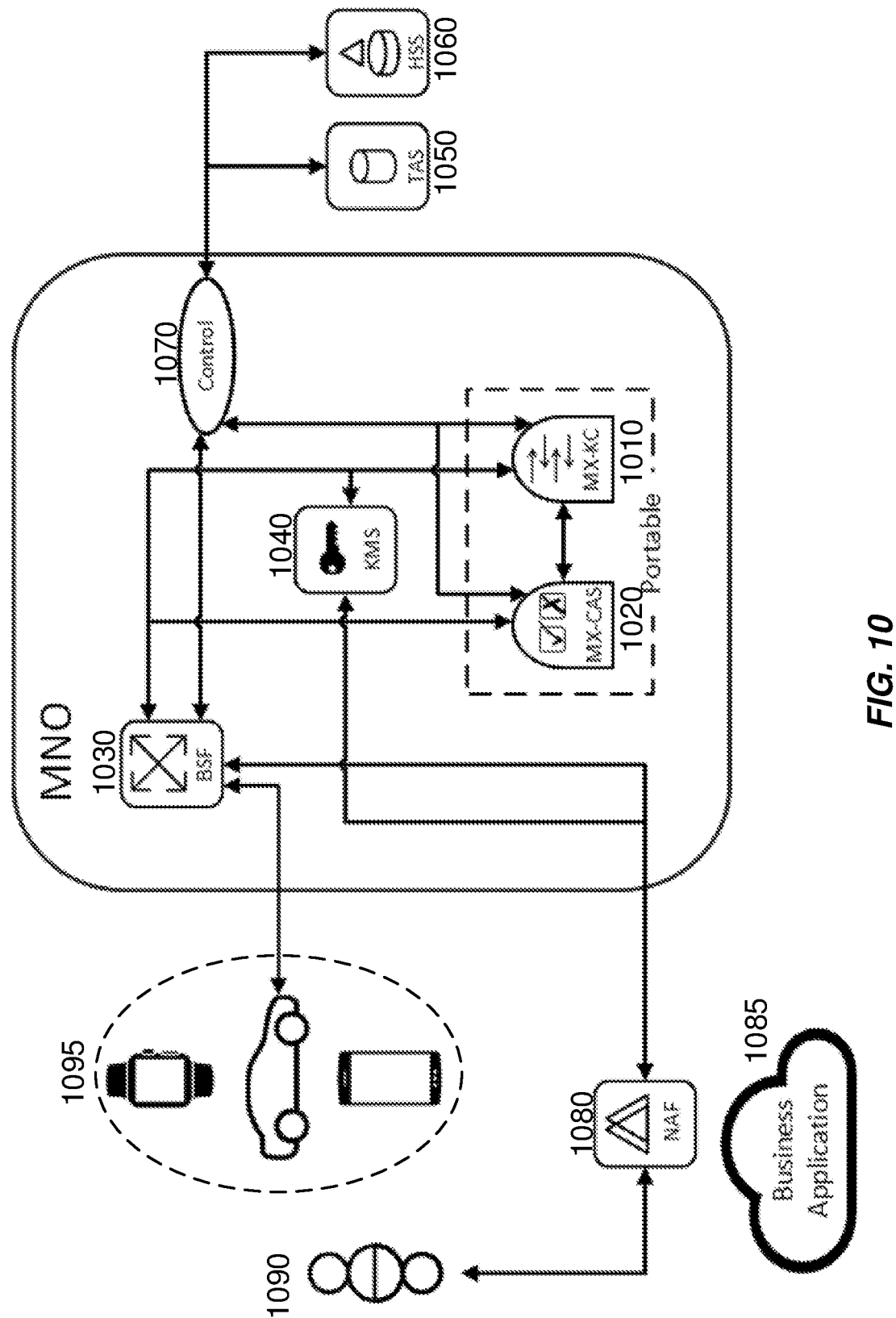
FIG. 10 shows a diagram of an exemplary multi-X Key Chaining (MX-KC) architecture, according to one or more exemplary embodiments of the present disclosure.

FIG. 10 shows a diagram of an exemplary architecture of a multi-X Key Chaining (MXKC) according to embodiments of the present disclosure, which leverages GBA components to address the multi-X scenarios and requirements discussed above. The architecture is divided into several modules and/or components whose functions and/or operations can be summarized as follows:

MX-KC (1010): generates hierarchy, secret key, and parameters required for encryption.

MX-CAS (1020): acts as interface to provide consent for the devices (1095). Subscriber uses the MX-CAS for giving consent to the devices for the application/service provider (SP). MX-CAS is also responsible for mapping the consent into parameters required by the MX-KC (1010).

BSF (1030): handles traffic between all the components of the architecture and is responsible for performing the bootstrapping for the devices (e.g., 1095) and subscribers (e.g., subscriber 1090).

KMS (Key Management Service) (1040): storage, management, and distribution of secret keys to SPs on behalf of subscriber (1090).

TAS (Telephony Application Server) (1050): stores profiles, devices list for the subscribers (e.g., in a XCAP (XML Configuration Access Protocol) document).

HSS (Home Subscriber Server) (1060): stores devices (1095) information required for bootstrapping and for TAS.

NAF (Network Application Function) (1080): application server, e.g., for business application (1085).

Control (1070): proxy through which outside entities must communicate with HSS (1060) and TAS (1050).

TAS (1050): stores profiles, devices list for the subscribers (e.g., in a XCAP document).

HSS (1060): stores devices (1095) information required for bootstrapping and for TAS.

NAF (1080): application server, e.g., for business application (1085).

Control (1070): proxy through which outside entities must communicate with HSS (1060) and TAS (1050).

In various embodiments, during initialization, the subscriber derives Ks based on utilizing GBA for this bootstrapping operation. MX-KC then uses Ks to initialize itself for generating the hierarchy of device IDs, PK (required by the devices for encryption), and MSK (required to generating the user secret key (SK) to be used, by the SP, for that subscriber/user. The subscriber uses MX-CAS to set up the consents for the devices, which are mapped into a parameter and then forwarded to the MX-KC. In turn, MX-KC generates the secret key for the SP and sends it to KMS.

When a subscriber device and/or application wants to send encrypted data to a business application or application server (e.g., of the SP), it can authenticate itself to the MX-KC in order to the get the PK needed for the encryption. The device uses the PK and its identity to encrypt and send data to the business application. When the SP wants to decrypt the received data, it can request a SK from the KMS and, if the SP has the access privilege for that data, the SP will receive the SK and be able to decrypt the data. The details of these process are shown in the sequence diagrams below.

Figure 11:
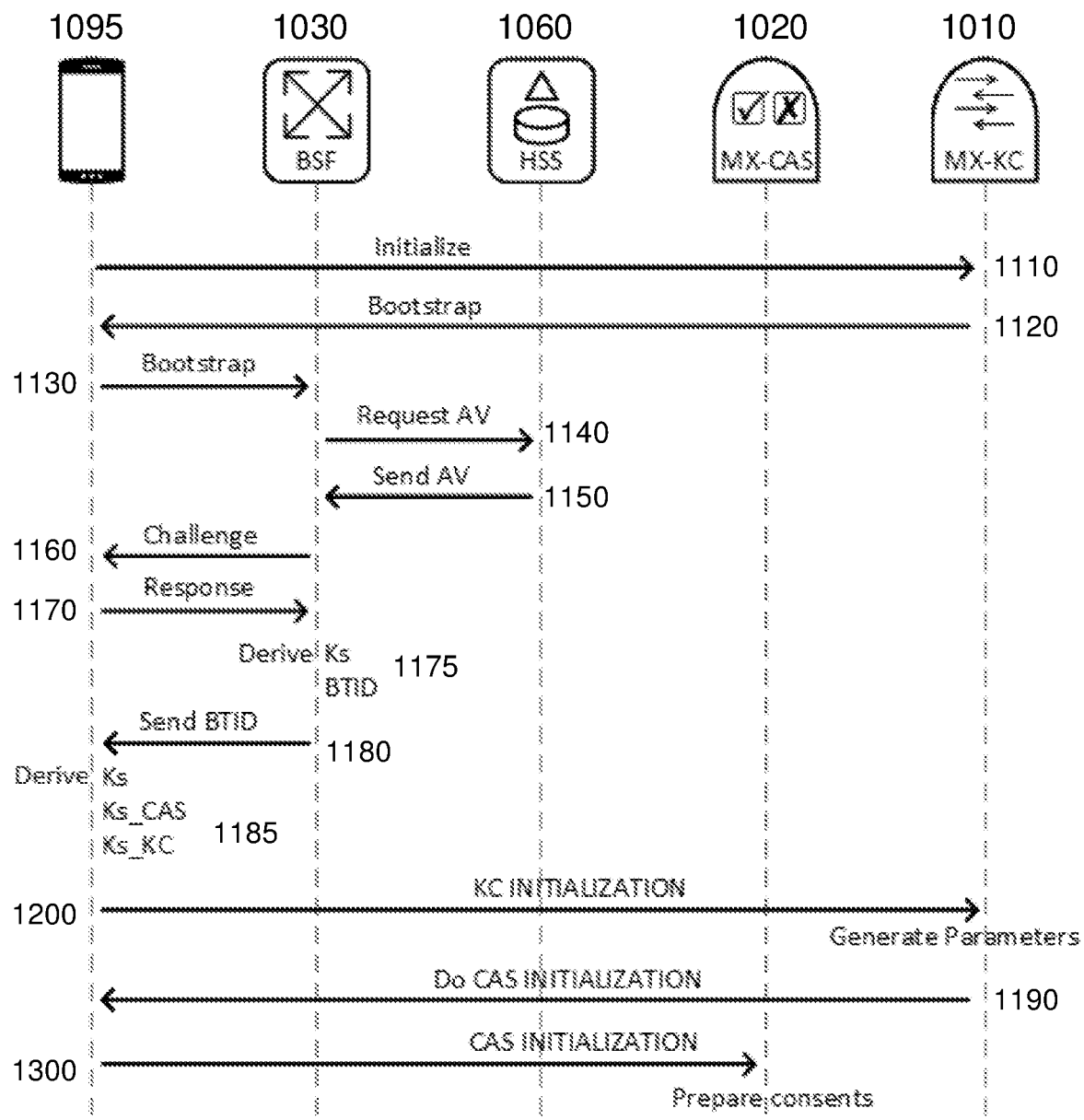
FIG. 11 shows an exemplary signal flow diagram for subscriber initialization, according to one or more exemplary embodiments of the present disclosure.

FIG. 11 shows a signal flow diagram of an exemplary method and/or procedure for subscriber initialization, according to various exemplary embodiments of the present disclosure. The exemplary method and/or procedure can be used when a subscriber wants to set up their devices for the first time for use with MX-KC. For example, the exemplary method and/or procedure can be performed on a "master device" associated with the subscriber. In some embodiments, the particular device can be identified as a "master device" based on its performance of the exemplary method and/or procedure.

Although the operations shown in FIG. 11 are illustrated in a particular order, this order is exemplary and the operations shown can be performed in different orders, and can be combined and/or divided into operations having different functionality than shown in FIG. 11. Furthermore, the exemplary method and/or procedure shown in FIG. 11 can be complementary to other exemplary methods and/or procedures disclosed herein, such that they are capable of being used cooperatively to provide the benefits, advantages, and/or solutions to problems described hereinabove. For example, the exemplary method and/or procedure shown in FIG. 11 can be used with one or more of the exemplary methods and/or procedures shown in FIGS. 12-16.

In operation 1110, the subscriber sends an initialization request to MX-KC, which responds (operation 1120) to the subscriber with a request to authenticate via bootstrapping. In operation 1130, the subscriber sends a bootstrap request to the BSF, which is accompanied with the subscriber's ID (e.g., IMS (Integrated Management System) private user identity (IMPI) associated with the mobile network). Subsequently, in operation 1140, the BSF sends the subscriber ID to the HSS with a request for an authentication vector (AV) for that subscriber, which the HSS provides in operation 1150 so long as the subscriber ID is valid. The AV can include a challenge (e.g., a random number), an expected response, and a cipher key usable in the authentication. In block 1160, the BSF sends the challenge to the subscriber, which returns a response in 1170. If the response matches the expected response, the BSF derives the bootstrap key Ks and the associated bootstrap identifier (BTID) parameter (operation 1175), then sends BTID to the subscriber (operation 1180). The BSF also retains the BTID, which it can later use to identify the associated Ks used to generate session keys for various entities, as explained below. After receiving BTID, the subscriber uses it to derive its own bootstrap key Ks, as well as keys $Ks_{CAS}$ and $Ks_{KC}$ used for further secure communication with MX-CAS and MX-KC (operation 1185).

Operation 1200 (key-chaining (KC) initialization) is described below in relation to FIG. 12. After KC initialization, the MX-KC responds to the subscriber with a request to perform CAS initialization (operation 1190). The resulting operation 1300 (CAS initialization) is described below in relation to FIG. 13.

Figure 12:
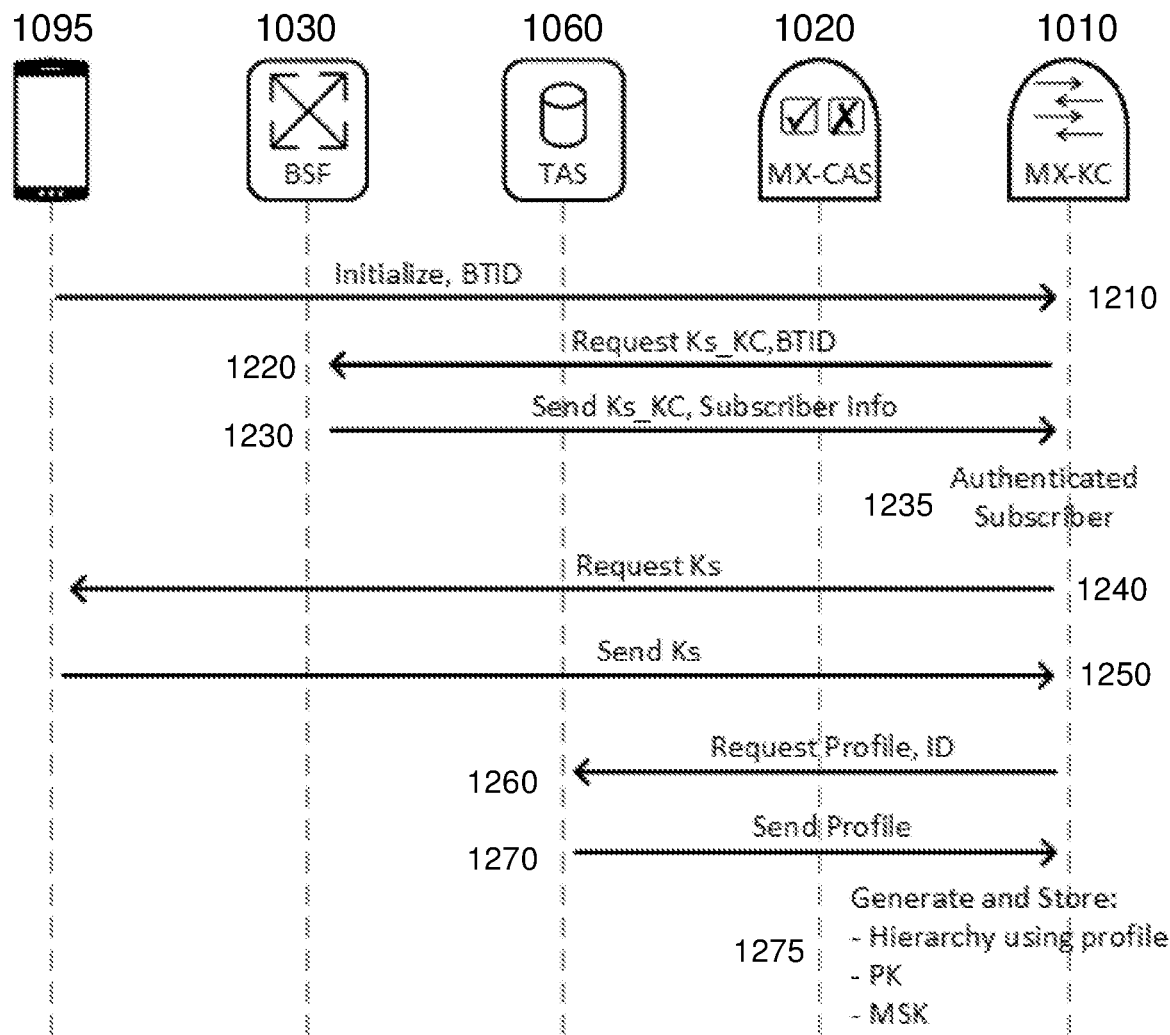
FIG. 12 shows an exemplary signal flow diagram for key-chaining (KC) initialization, according to one or more exemplary embodiments of the present disclosure.

FIG. 12 shows a signal flow diagram of an exemplary method and/or procedure for key-chaining (KC) initialization, according to various exemplary embodiments of the present disclosure. For example, the exemplary method and/or procedure can be used to set up the hierarchy of the subscriber's devices and applications and generates the parameters for encryption according to this hierarchy. Although the operations are illustrated in a particular order, this order is exemplary and the operations shown can be performed in different orders, and can be combined and/or divided into operations having different functionality than shown in FIG. 12. Furthermore, the exemplary method and/or procedure shown in FIG. 12 can be complementary to other exemplary methods and/or procedures disclosed herein, such that they are capable of being used cooperatively to provide the benefits, advantages, and/or solutions to problems described hereinabove. For example, the exemplary method and/or procedure shown in FIG. 12 can be used with one or more of the exemplary methods and/or procedures shown in FIGS. 11 and 13-16.

In operation 1210, the subscriber sends a request for initialization to MX-KC along with ID parameter BTID (derived, e.g., by BSF in operation 1175). In operation 1220, the MX-KC sends a request to the BSF for the key $Ks_{KC}$ to be used for further communication with the subscriber, which the MX-KC identifies using the BTID received in operation 1210. In operation 1230, the BSF responds with both $Ks_{KC}$ and the subscriber information (e.g., a subscriber identifier). In operation 1235, MX-KC uses this received information to authenticate the subscriber. In operation 1240, after subscriber authentication, MX-KC requests Ks from the subscriber, which the subscriber provides in operation 1250.

In operation 1260, the MX-KC requests the application- or service-specific profile of the subscriber from the TAS. For example, the TAS can be provisioned by the subscriber's mobile network operator. The MX-KC identifies the particular subscriber to the TAS using the subscriber ID received in operation 1230. In operation 1270, the TAS responds with the application- or service-specific profile of the subscriber, which MX-KC uses in operation 1275 to generate and store a hierarchy of device/application IDs. In addition, the MX-KC generates the subscriber's public key (PK) and master secret key (MSK). The MX-KC then stores these generated parameters in preparation for possible future use, as explained below.

Figure 13:
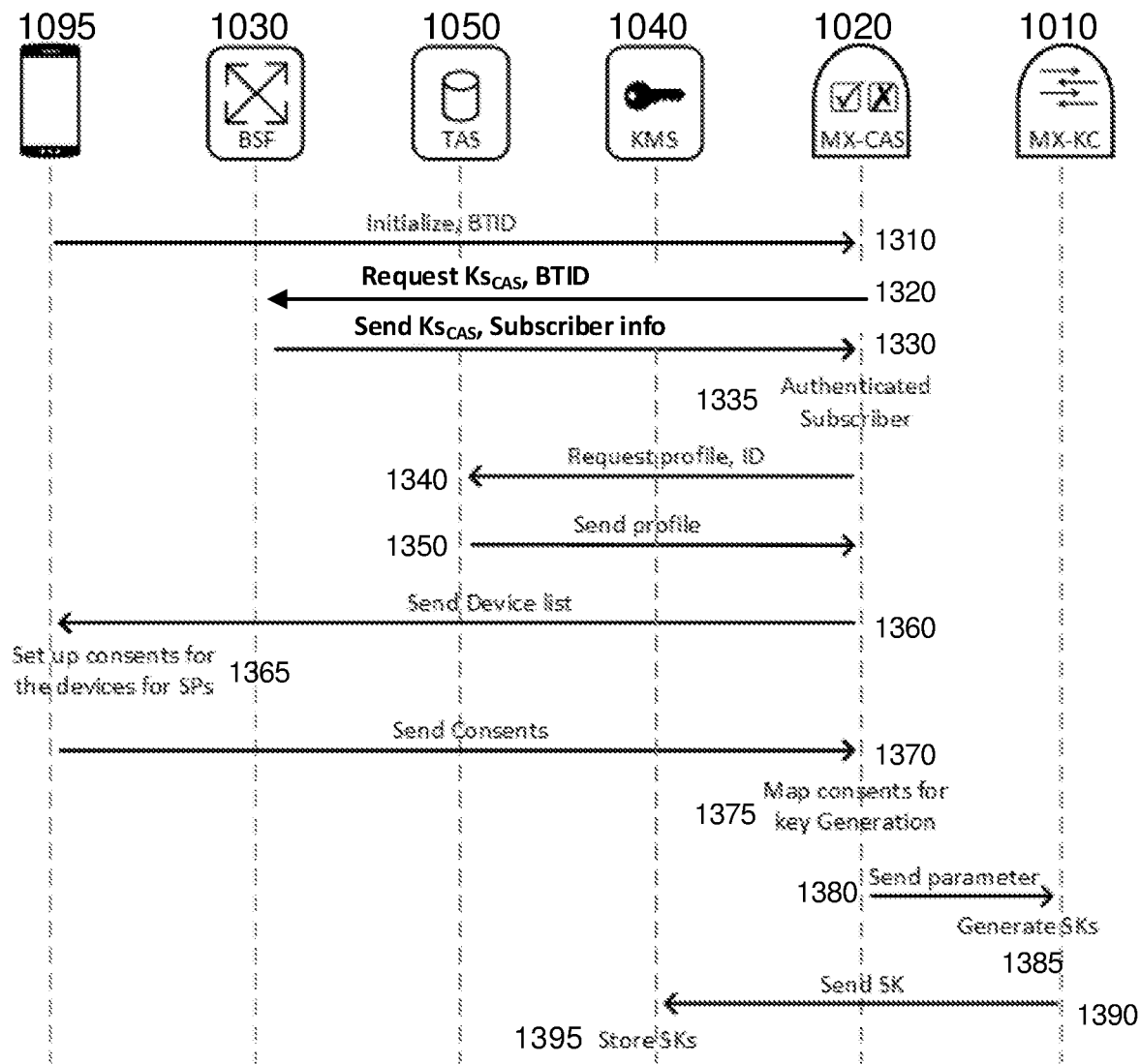
FIG. 13 shows an exemplary signal flow diagram for context-aware service (CAS) initialization, according to various exemplary embodiments of the present disclosure.

FIG. 13 shows a signal flow diagram of an exemplary method and/or procedure for context-aware service (CAS) initialization, according to various exemplary embodiments of the present disclosure. For example, the exemplary method and/or procedure can be used to facilitate initialization of consent settings for any or all of the subscriber's devices and/or applications. Although the operations are illustrated in a particular order, this order is exemplary and the operations shown can be performed in different orders, and can be combined and/or divided into operations having different functionality than shown in FIG. 13. Furthermore, the exemplary method and/or procedure shown in FIG. 13 can be complementary to other exemplary methods and/or procedures disclosed herein, such that they are capable of being used cooperatively to provide the benefits, advantages, and/or solutions to problems described hereinabove. For example, the exemplary method and/or procedure shown in FIG. 13 can be used with one or more of the exemplary methods and/or procedures shown in FIGS. 11-12 and 14-16.

In operation 1310, the subscriber sends a request for initialization to MX-CAS along with bootstrapping identity BTID. In operation 1320, the MX-CAS sends a request to the BSF for the key $Ks_{CAS}$ to be used for further communication with the subscriber, which the MX-CAS identifies using the BTID received in operation 1310. In operation 1330, after finding a match with a previously-stored BTID (e.g., derived and stored in operation 1175 of FIG. 11), BSF responds with both $Ks_{CAS}$ and the subscriber information (e.g., a subscriber identifier). In operation 1335, MX-CAS uses this received information to authenticate the subscriber. In operation 1340, after subscriber authentication, MX-CAS requests the list of entities associated with the subscriber from the TAS, identifying the particular subscriber using the subscriber ID received in operation 1330. In operation 1350, the TAS responds with the list of entities associated with the subscriber.

In operation 1360, the MX-CAS responds to the subscriber's initialization request (made, e.g., in operation 1310) by sending the list of entities associated with the subscriber. This list can be secured using the key $Ks_{CAS}$ received in operation 1330. In operation 1365, the subscriber establishes (e.g., initializes) the consents for the entities comprising the list. For example, for each device and/or profile on the list, consents can be established with respect to one or more SPs. In operation 1370, using $Ks_{CAS}$, the subscriber securely sends the consents to MX-CAS, which maps the consents into the ID hierarchy (operation 1375) and sends the ID hierarchy to MX-KC (operation 1380). In operation 1385, MX-KC generates the secret key (SK) based on the subscriber consents and ID hierarchy, as well as the subscriber MSK previously stored (e.g., in operation 1275). In operation 1390, the MX-KC sends the SK to the key management system (KMS) database, where it is stored (operation 1395) for subsequent distribution upon valid request by SPs (e.g., as needed to decrypt data sent by the subscriber).

Figure 14:
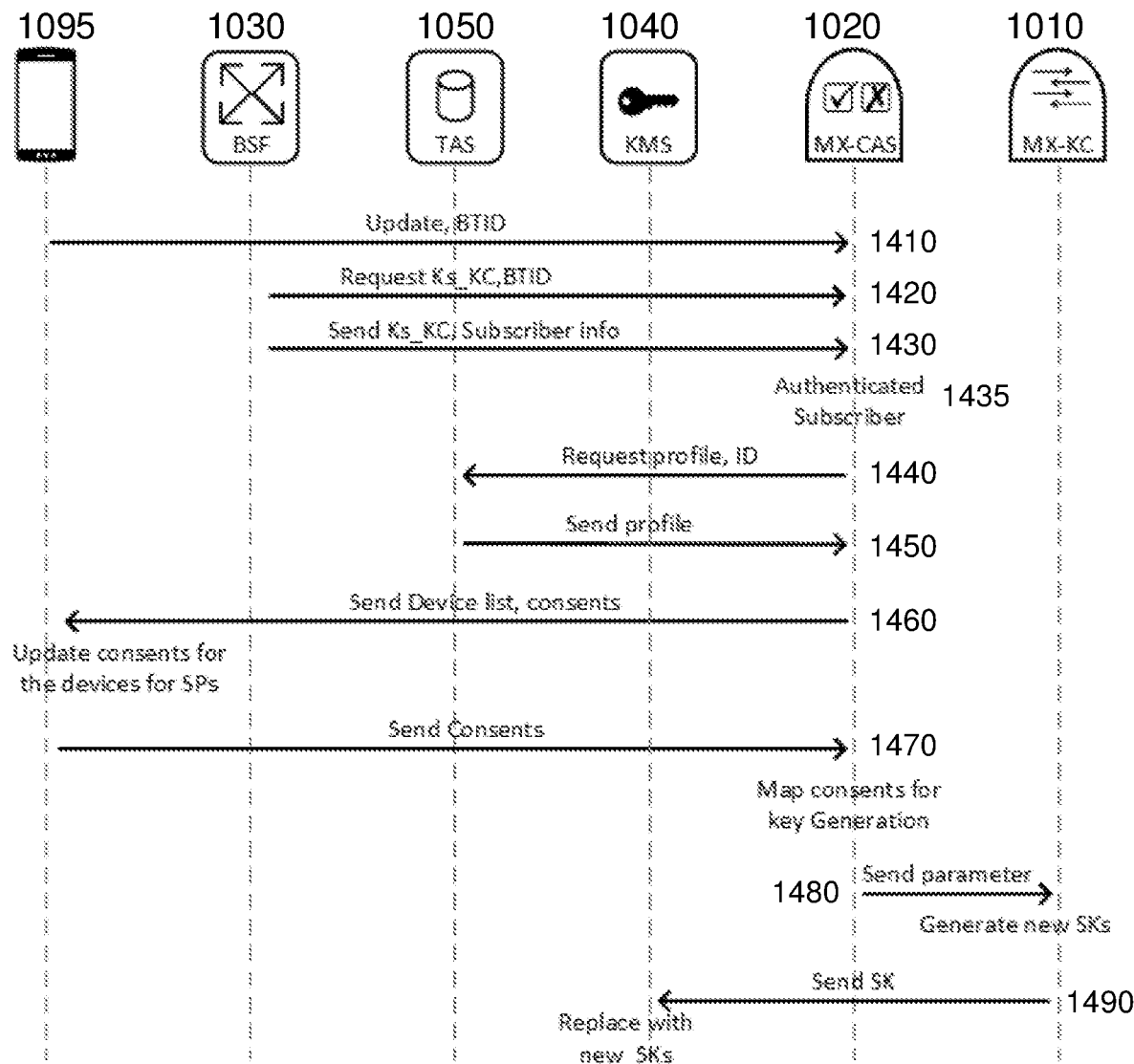
FIG. 14 shows an exemplary signal flow diagram for context-aware service (CAS) update, according to various exemplary embodiments of the present disclosure.

FIG. 14 shows a signal flow diagram of an exemplary method and/or procedure for context-aware service (CAS) update, according to various exemplary embodiments of the present disclosure. For example, the exemplary method and/or procedure can be used to by the subscriber to update consents for the associated devices. Since the CAS update operations shown in FIG. 14 are substantially similar to the CAS initialization operations shown in FIG. 13 (CAS initialization), the above descriptions of particular operations apply equally to like-numbered operations in FIG. 14.

Figure 15:
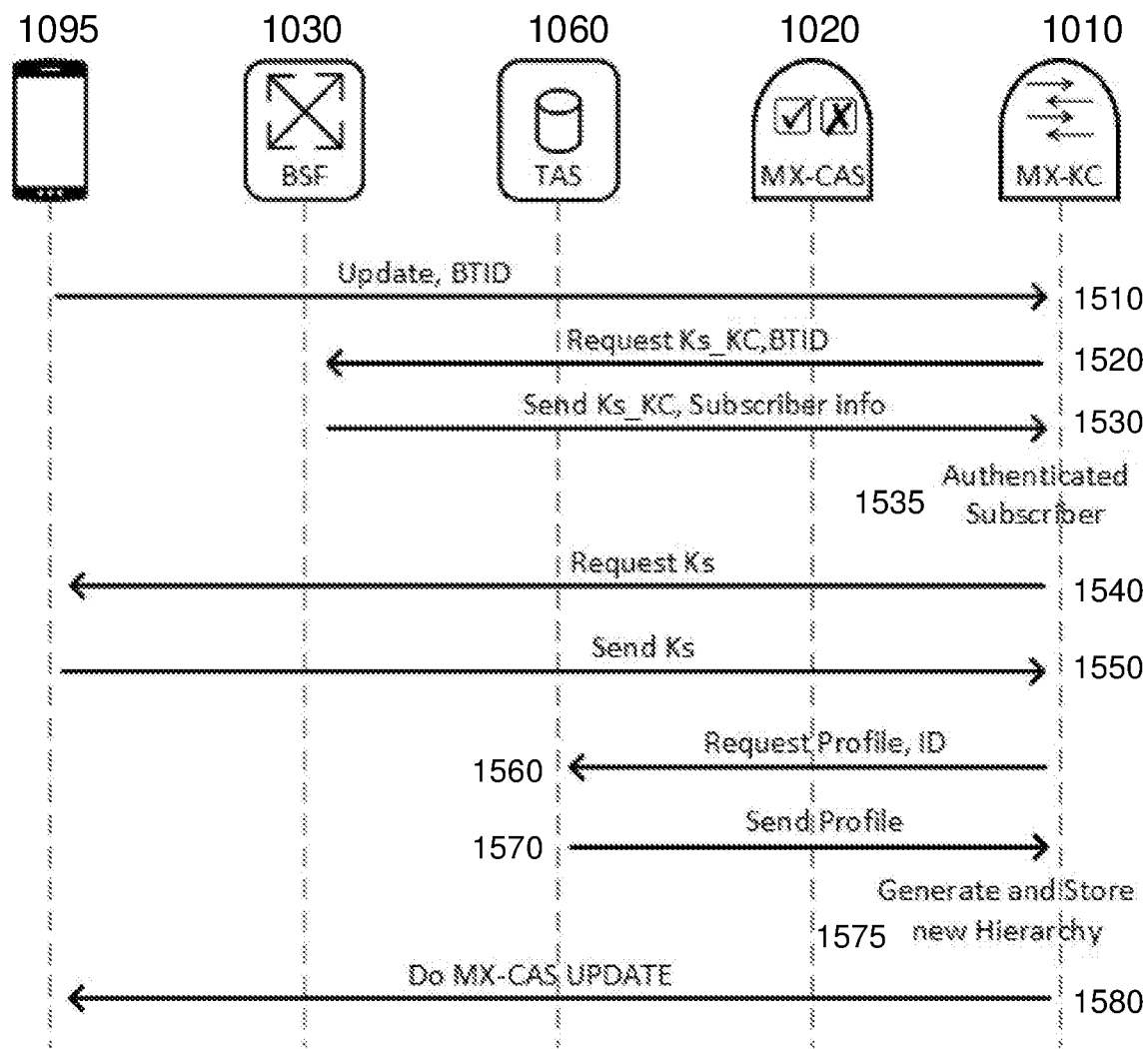
FIG. 15 shows an exemplary signal flow diagram for key-chaining (KC) update, according to various exemplary embodiments of the present disclosure.

FIG. 15 shows a signal flow diagram of an exemplary method and/or procedure for key-chaining (KC) update, according to various exemplary embodiments of the present disclosure. Although the operations are illustrated in a particular order, this order is exemplary and the operations shown can be performed in different orders, and can be combined and/or divided into operations having different functionality than shown in FIG. 15. Furthermore, the exemplary method and/or procedure shown in FIG. 15 can be complementary to other exemplary methods and/or procedures disclosed herein, such that they are capable of being used cooperatively to provide the benefits, advantages, and/or solutions to problems described hereinabove. For example, the exemplary method and/or procedure shown in FIG. 15 can be used with one or more of the exemplary methods and/or procedures shown in FIGS. 11-14 and 16.

Operations 1510-1570 shown in FIG. 15 are substantially similar to respective CAS initialization operations 1210-1270 shown in FIG. 12 and, as such, will not be described further below. After generating and storing an updated hierarchy of device/application IDs (operation 1575), MX-KC requests the subscriber to perform a CAS update to incorporate the updated hierarchy (operation 1580). The subscriber can perform such an update using the exemplary method and/or procedure shown in FIG. 14.

Figure 16:
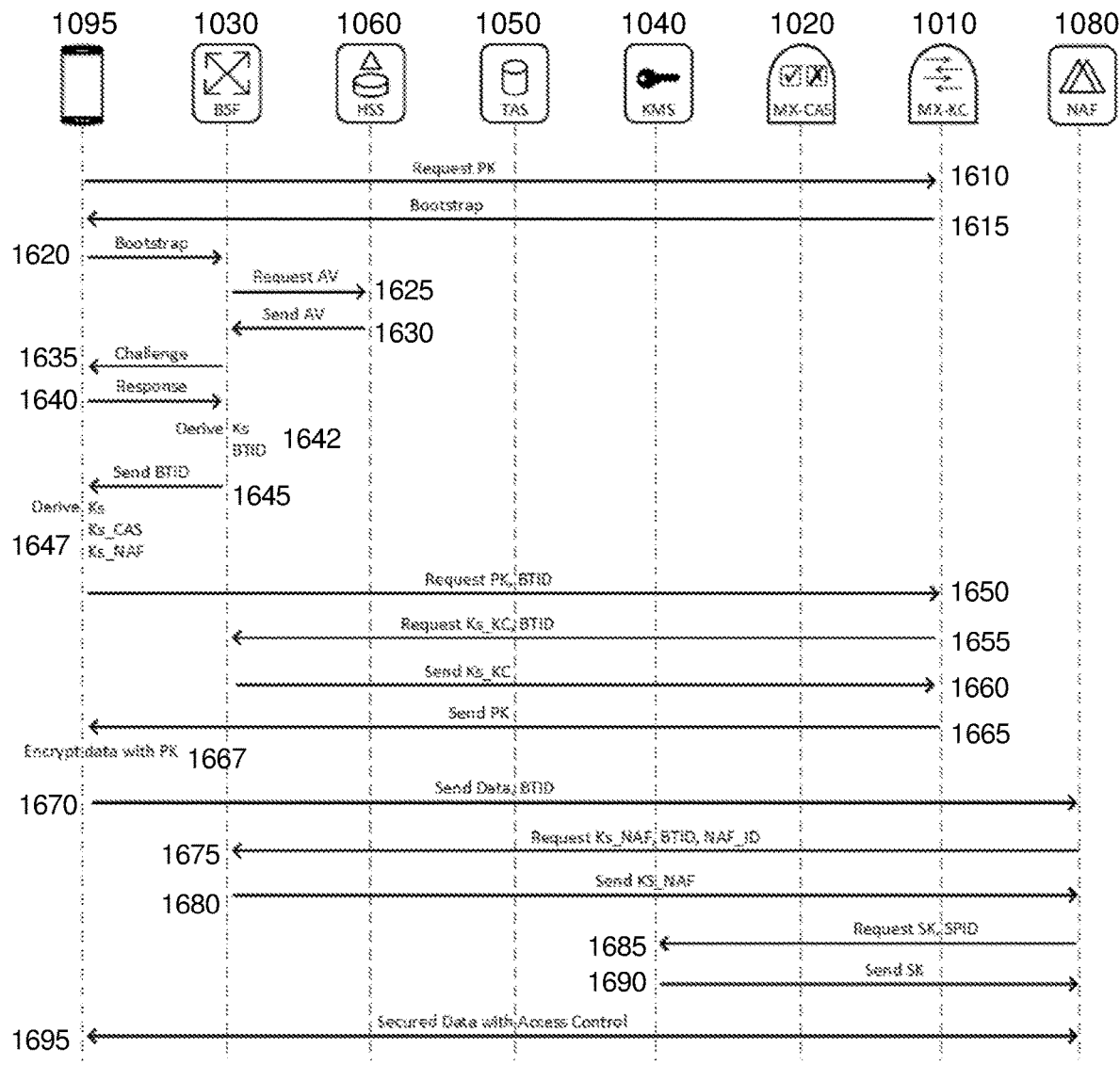
FIG. 16 shows an exemplary signal flow diagram for device initialization, according to various exemplary embodiments of the present disclosure.

FIG. 16 shows a signal flow diagram of an exemplary method and/or procedure for device initialization, according to various exemplary embodiments of the present disclosure. For example, the exemplary method and/or procedure can be used to initialize a particular device before sending data (e.g., from that device) to an application/service provider for the first time. For example, the exemplary method and/or procedure in FIG. 16 can be used to initialize a "secondary device" after a "master device" has performed the exemplary method and/or procedure shown in FIG. 11.

Although the operations are illustrated in a particular order, this order is exemplary and the operations shown can be performed in different orders, and can be combined and/or divided into operations having different functionality than shown in FIG. 16. Furthermore, the exemplary method and/or procedure shown in FIG. 16 can be complementary to other exemplary methods and/or procedures disclosed herein, such that they are capable of being used cooperatively to provide the benefits, advantages, and/or solutions to problems described hereinabove. For example, the exemplary method and/or procedure shown in FIG. 16 can be used with one or more of the exemplary methods and/or procedures shown in FIGS. 11-15.

In operation 1610, the device sends a request to MX-KC for a public key (PK) to be used for subscriber communication with SP's NAF. In operation 1615, MX-KC responds to the device with a request to authenticate via bootstrapping. In operation 1620, the device sends a bootstrap request to the BSF, which is accompanied with a device ID. Subsequently, in operation 1625, the BSF sends the device ID to the HSS with a request for an authentication vector (AV) for that device, which the HSS provides in operation 1630 so long as the device ID is valid. The AV can include a challenge (e.g., a random number), an expected response, and a cipher key used in the authentication. In block 1635, the BSF sends the challenge to the device, which returns a response in 1640. If the response matches the expected response, the BSF derives the bootstrap key Ks and the associated bootstrap identifier BTID (operation 1642), then sends BTID to the device (operation 1645). After receiving BTID, the device uses it to derive its own bootstrap key Ks as well as keys $Ks_{CAS}$ and $Ks_{NAF}$ (operation 1647), which are usable, respectively, for further secure communication with MX-CAS and NAF.

In operation 1650, the device again requests from MX-KC the public key (PK) that is usable for encrypting user data to be sent to the NAF, using the BTID parameter (received in operation 1645) subscriber identifying information. In operation 1655, the MX-KC sends a request to the BSF for key $Ks_{KC}$ to be used for secure communication with the subscriber device, identified using the BTID received in operation 1650. In operation 1660, the BSF responds with $Ks_{KC}$ and the subscriber identifying information. In operation 1665, using the received BTID, the MX-KC identifies the public key (PK) usable for the device's communication with NAF, encrypts it using $Ks_{KC}$, and sends it to the device. In operation 1667, the device encrypts data with the received PK and its own ID, associates its own BTID parameter with the encrypted data, then uses $Ks_{NAF}$ to securely send the combined information to the NAF (operation 1670).

In operation 1675, the NAF requests from BSF the key $Ks_{NAF}$ usable for communicating with the user device, the request including the BTID associated with the device (received in operation 1670) and the service provider ID (SPID) associated with the NAF. In operation 1680, the BSF responds with $Ks_{NAF}$. In operation 1685, the NAF requests, from the key management system (KMS), the secret key (SK) usable to secure data communication from the device to the SP. The request includes the SPID. In operation 1690, KMS responds to NAF with the SK. In operation 1695, using this SK and the PK retrieved by the device in operation 1665, the NAF and the subscriber's device are able to communicate securely.

Two primary components of the exemplary embodiments described above are the MX-CAS and MX-KC, which are responsible for the consent management and key generations for encryption. In various embodiments, both of these components can be implemented and/or deployed in various locations according to requirements and/or agreements between subscriber and mobile network operation (MNO).

Figure 17A:
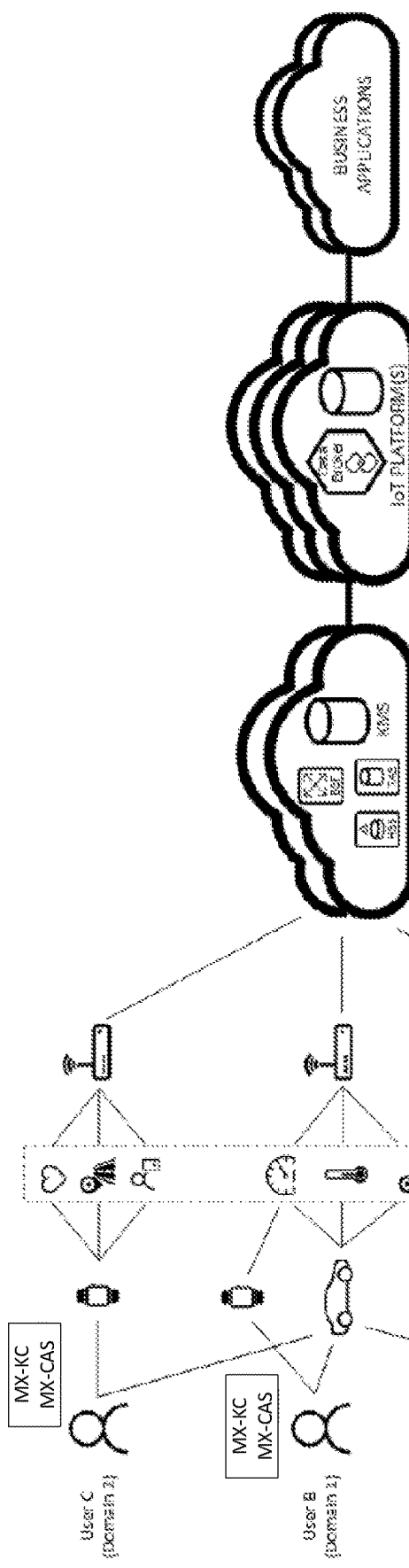
FIGS. 17A-C show high-level diagrams of three different options and/or architectures for deployment of MX-CAS (Multi-X Context-Aware Service) and MX-KC (Multi-X Key Chaining), according to various exemplary embodiments of the present disclosure.
Figure 17B:
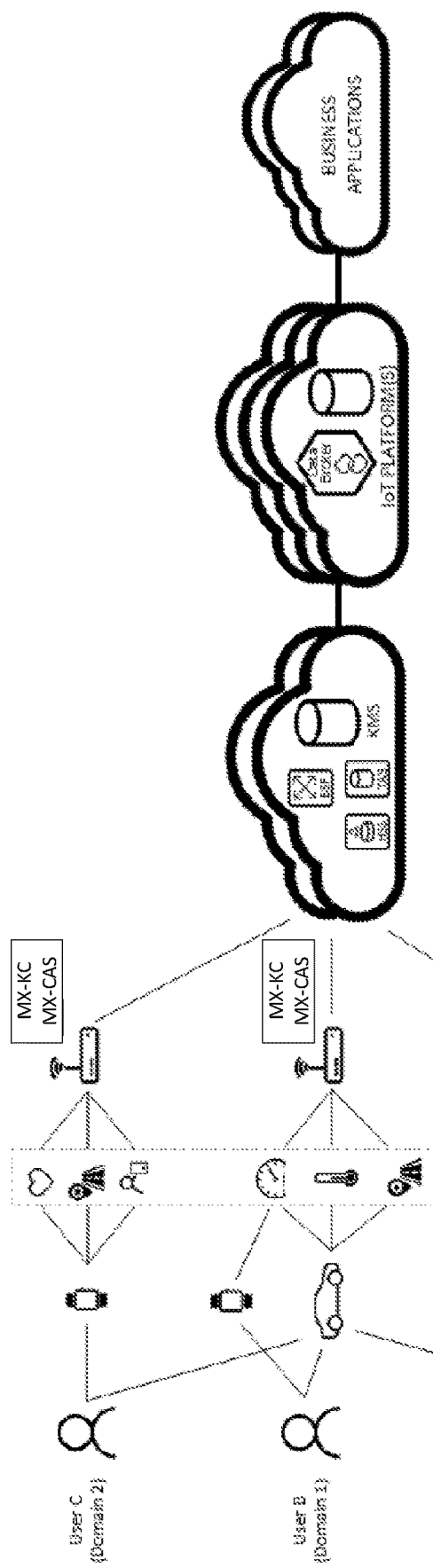
Figure 17C:
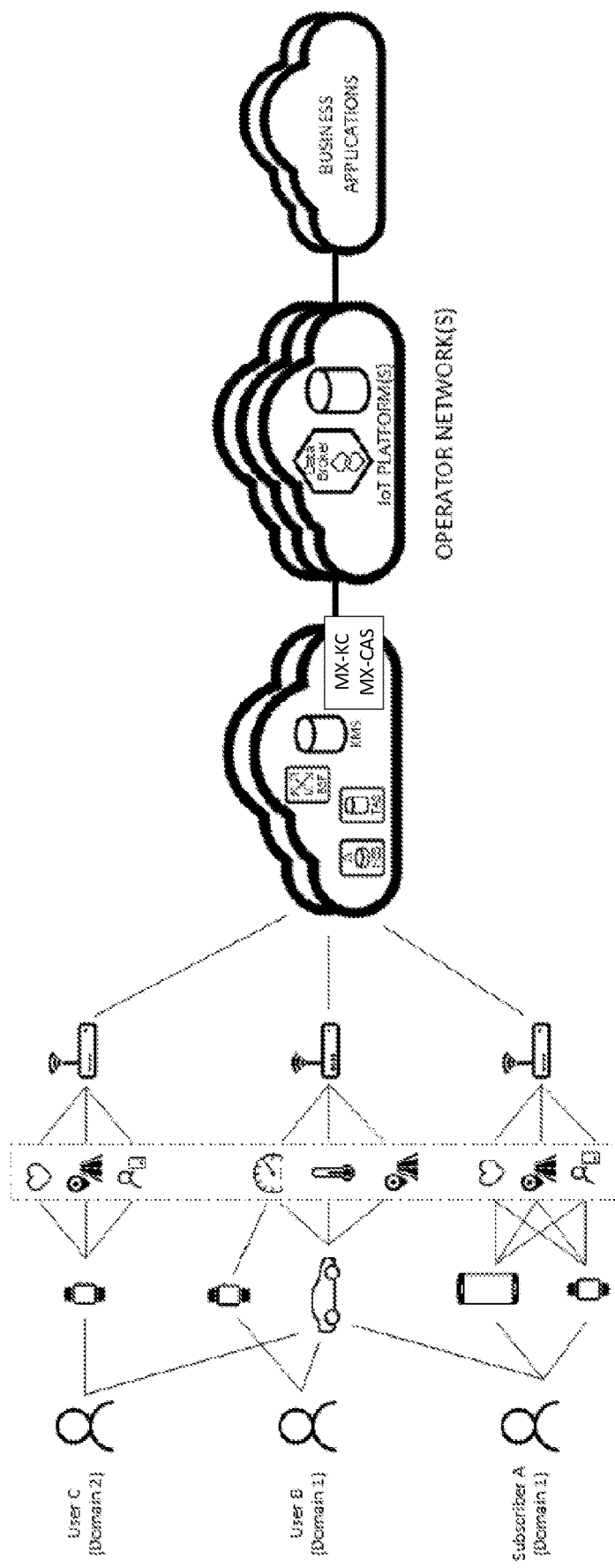

FIGS. 17A-C show high-level diagrams of three different options and/or architectures for deployment of MX-CAS and MX-KC, according to various exemplary embodiments of the present disclosure. In FIG. 17A, both MX-CAS and MX-KC are substantially located in a subscriber device, e.g., in a secure, tamper-resistant environment. In this arrangement, various security-related operations described above with respect to FIGS. 11-16 may not be required and/or relevant. For example, operations 1210-1235 in FIG. 12, 1310-1335 in FIG. 13, 1410-1435 in FIG. 14, 1510-1535 in FIG. 15, and 1610-1665 in FIG. 16 are not required if MX-KC and MX-CAS are located within the subscriber device.

FIG. 17B illustrates other exemplary embodiments in which both MX-CAS and MX-KC can be deployed at the gateway level (e.g., a gateway to a particular domain). FIG. 17C illustrates other exemplary embodiments in which both MX-CAS and MX-KC can be deployed at the mobile network operator (MNO) level (e.g., in an MNO data center). Other exemplary embodiments can include combinations of the three deployment options illustrated in FIGS. 17A-C.

Figure 18:
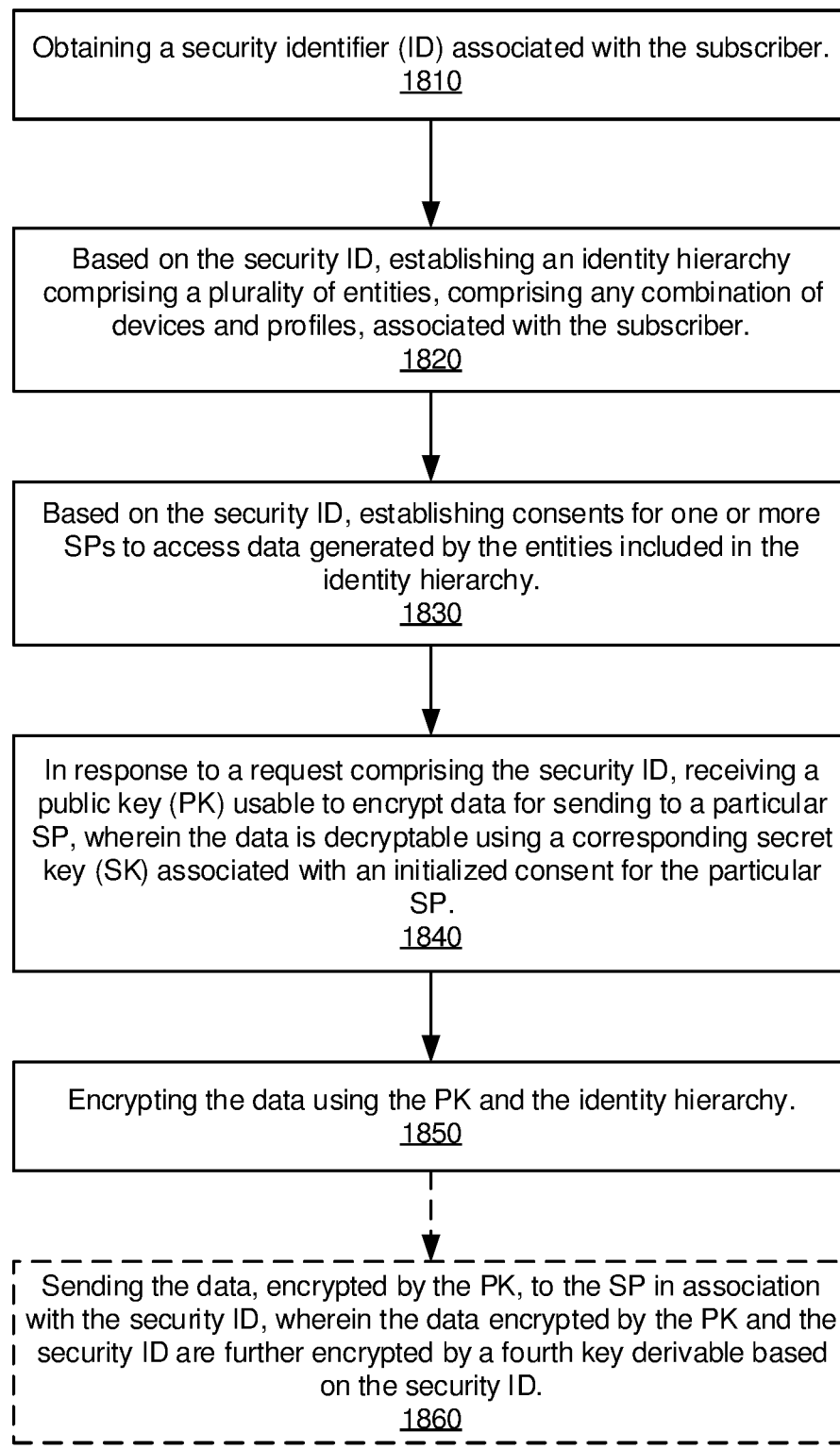
FIGS. 18-21 are flow diagrams illustrating various exemplary methods and/or procedures for facilitating secure communication between a subscriber to a mobile communication network and one or more service providers (SPs), wherein the subscriber is associated with a plurality of entities comprising any combination of devices and profiles, according to various exemplary embodiments of the present disclosure.

FIG. 18 shows a flow diagram of an exemplary method and/or procedure for facilitating secure communication between a subscriber to a mobile communication network and one or more service providers (SPs), wherein the subscriber is associated with a plurality of entities comprising any combination of devices and profiles, according to various exemplary embodiments of the present disclosure. For example, the exemplary method and/or procedure shown in FIG. 18 can be performed by a subscriber device, such as a user equipment (UE). Although the operations are illustrated in a particular order, this order is exemplary and the operations shown can be performed in different orders, and can be combined and/or divided into operations having different functionality than shown in FIG. 18. Dashed lines indicate optional operations.

Furthermore, the exemplary method and/or procedure shown in FIG. 18 can be complementary to other exemplary methods and/or procedures disclosed herein, such that they are capable of being used cooperatively to provide the benefits, advantages, and/or solutions to problems described herein. For example, the exemplary method and/or procedure shown in FIG. 18 can be used with one or more of the exemplary methods and/or procedures shown in FIGS. 19-21.

The exemplary method and/or procedure can include operations of block 1810, in which the subscriber device can obtain a security identifier (ID) associated with the subscriber. In some embodiments, the security ID comprises a bootstrap identifier (BTID), and obtaining the security ID comprises performing an authentication key agreement (AKA) with a bootstrapping server (BSF) and receiving the BTID. In some embodiments, this can include, various ones of operations 1110 to 1180 shown in FIG. 11 or operations 1610 to 1645 shown in FIG. 16. For example, performing and AKA with the BSF can include sending a bootstrap request to the BSF; receiving an authenticate challenge from the BSF; sending an authentication response to the BSF; and receiving the BTID.

In some embodiments, the exemplary method and/or procedure can also include the operations of block 1810, in which the subscriber device can generate a plurality of keys based on the security ID.

The exemplary method and/or procedure can also include operations of block 1820, in which the subscriber device can, based on the security ID, establish an identity hierarchy comprising the plurality of entities associated with the subscriber. In some embodiments, the identity hierarchy further comprises one or more applications associated with each of the entities. In some embodiments, the identity hierarchy further comprises one or more time periods associated with at least a portion of the applications.

In some embodiments, establishing the identity hierarchy can include sending an initialization request comprising the security ID, wherein the initialization request is encrypted using a second key derivable based on the security ID; receiving a request for a first key of the plurality of keys generated based on the security ID; decrypting the request using the second key; and sending a response comprising the first key, wherein the response is encrypted using the second key. In some embodiments, these operations can correspond to various ones of operations 1210 to 1275 shown in FIG. 12.

The exemplary method and/or procedure can also include operations of block 1830, in which the subscriber device can, based on the security ID, establish consents for one or more SPs to access data generated by the entities included in the identity hierarchy. In some embodiments, this can include establishing consents for the one or more SPs to access data generated by the one or more applications associated with each of the entities. In some embodiments, this can include establishing consents for the one or more SPs to access data generated during the one or more time periods by the at least a portion of the applications.

In some embodiments, the operations of block 1830 can include sending a request comprising the security ID, wherein the request is encrypted using a third key derivable based on the security ID; receiving a list of entities, comprising any combination of devices and profiles, associated with the subscriber; decrypting the list of entities using the third key; associating consents, for each of the one or more SPs, with the entities included in the list; and sending a response comprising the consents, wherein the response is encrypted using the third key. In some embodiments, these operations can correspond to various ones of operations 1310 to 1370 shown in FIG. 13.

The exemplary method and/or procedure can also include operations of block 1840, in which the subscriber device can, in response to a request comprising the security ID, receive a public key (PK) usable to encrypt data for sending to a particular SP, wherein the data is decryptable using a corresponding secret key (SK) associated with an established consent for the particular SP. In some embodiments, receiving the PK usable to encrypt data for sending to a particular SP can include sending a request for the PK, wherein the request comprises the security ID and is encrypted using a second key derivable based on the security ID; receiving a response comprising the PK; and decrypting the response using the second key. In some embodiments, these operations can correspond to various ones of operations 1650 to 1665 shown in FIG. 16.

The exemplary method and/or procedure can also include operations of block 1850, in which the subscriber device can encrypt the data using the PK and the identity hierarchy. In some embodiments, the exemplary method and/or procedure can also include the operations of block 1860, in which the subscriber device can send the data, encrypted by the PK, to the SP in association with the security ID, wherein the data encrypted by the PK and the security ID are further encrypted by a fourth key derivable based on the security ID.

Figure 19:
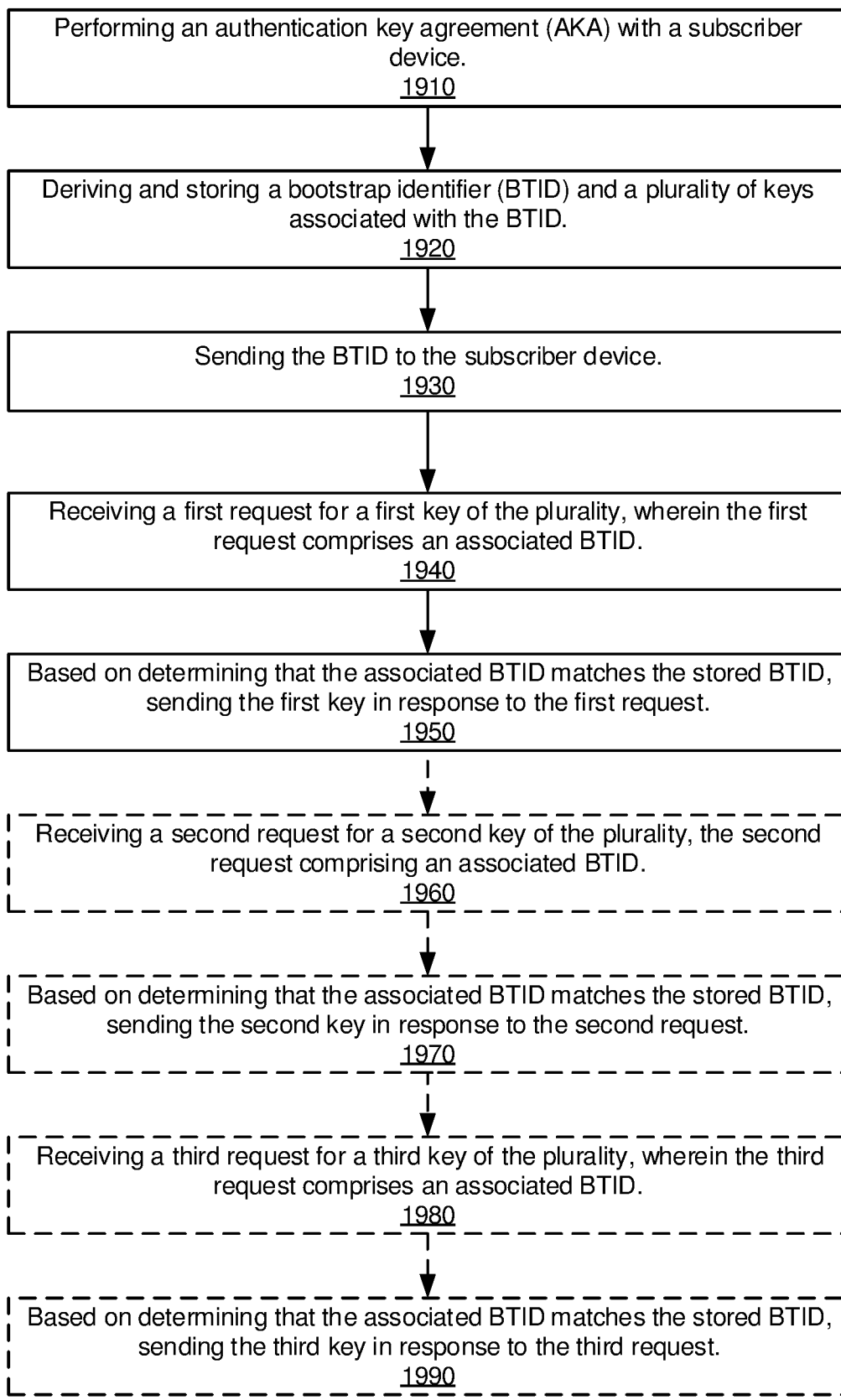

FIG. 19 shows a flow diagram of another exemplary method and/or procedure for facilitating secure communication between a subscriber to a mobile communication network and one or more service providers (SPs), wherein the subscriber is associated with a plurality of entities comprising any combination of devices and profiles, according to various exemplary embodiments of the present disclosure. For example, the exemplary method and/or procedure shown in FIG. 19 can be performed by a server (e.g., a boostrapping server (BSF) as described herein). Although the operations are illustrated in a particular order, this order is exemplary and the operations shown can be performed in different orders, and can be combined and/or divided into operations having different functionality than shown in FIG. 19. Dashed lines indicate optional operations.

Furthermore, the exemplary method and/or procedure shown in FIG. 19 can be complementary to other exemplary methods and/or procedures disclosed herein, such that they are capable of being used cooperatively to provide the benefits, advantages, and/or solutions to problems described herein. For example, the exemplary method and/or procedure shown in FIG. 19 can be used with one or more of the exemplary methods and/or procedures shown in FIGS. 18, 20, and 21.

The exemplary method and/or procedure can include operations of block 1910, in which the BSF can perform an authentication key agreement (AKA) with a subscriber device. In some embodiments, this can correspond to various ones of operations 1130 to 1170 shown in FIG. 11 or operations 1620 to 1640 shown in FIG. 16. The exemplary method and/or procedure can also include the operations of block 1920, in which the BSF can derive and store a bootstrap identifier (BTID) and a plurality of keys associated with the BTID. In some embodiments, this can correspond to operation 1175 shown in FIG. 11 or operation 1642 shown in FIG. 16. The exemplary method and/or procedure can also include the operations of block 1930, in which the BSF can send the BTID to the subscriber device. In some embodiments, this can correspond to operation 1180 shown in FIG. 11 or operation 1645 in FIG. 16.

The exemplary method and/or procedure can also include operations of block 1940, in which the BSF can receive a first request for a first key of the plurality, wherein the first request comprises an associated BTID. The exemplary method and/or procedure can also include the operations of block 1950, in which the BSF can, based on determining that the associated BTID matches the stored BTID, send the first key in response to the first request. In some embodiments, the first request is received from a key-chaining (KC) server; and the first key is sent to the KC server. In some embodiments, these operations can correspond to various ones of operations 1220 to 1230 shown in FIG. 12, operations 1520 to 1530 shown in FIG. 15, or operations 1655 to 1660 shown in FIG. 16.

In some embodiments, the exemplary method and/or procedure can also include the operations of block 1960, in which the BSF can receive a second request for a second key of the plurality, wherein the second request comprises an associated BTID. In such embodiments, the exemplary method and/or procedure can also include the operations of block 1970, in which the BSF can, based on determining that the associated BTID matches the stored BTID, send the second key in response to the second request. In some embodiments, the second request is received from a context-aware service (CAS) server; and the second key is sent to the CAS server. In some embodiments, these operations can correspond to various ones of operations 1320 to 1330 shown in FIG. 13 or operations 1420 to 1430 shown in FIG. 14.

In some embodiments, the exemplary method and/or procedure can also include the operations of block 1980, in which the BSF can receive a third request for a third key of the plurality, wherein the third request comprises an associated BTID. In such embodiments, the exemplary method and/or procedure can also include the operations of block 1990, in which the BSF can, based on determining that the associated BTID matches the stored BTID, send the third key in response to the third request. In some embodiments, the third request is received from a network application (NAF) server associated with a particular SP; and the third key is sent to the NAF server. In some embodiments, these operations can correspond to various ones of operations 1675 to 1680 shown in FIG. 16.

Figure 20:
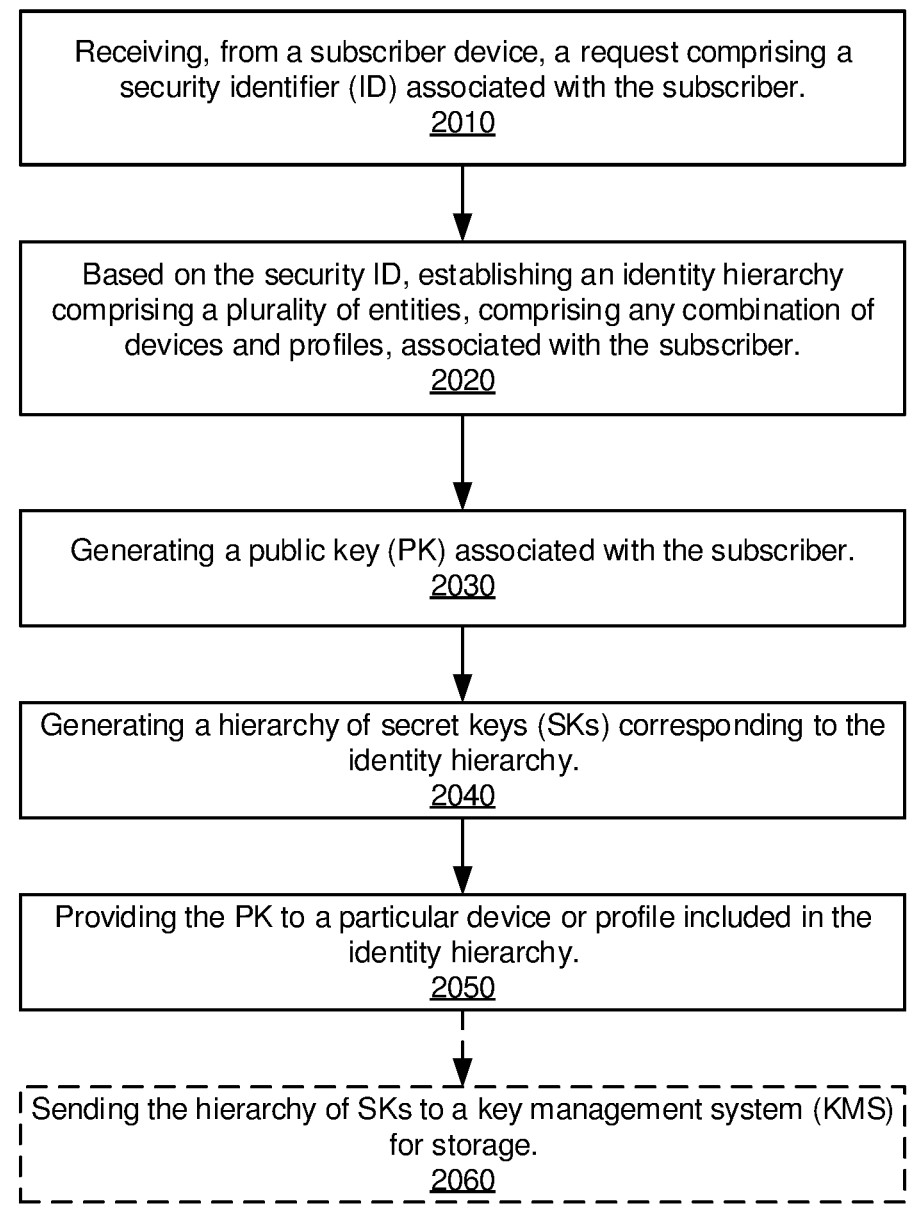

FIG. 20 shows a flow diagram of another exemplary method and/or procedure for facilitating secure communication between a subscriber to a mobile communication network and one or more service providers (SPs), wherein the subscriber is associated with a plurality of entities comprising any combination of devices and profiles, according to various exemplary embodiments of the present disclosure. For example, the exemplary method and/or procedure shown in FIG. 20 can be performed by a server (e.g., a key-chaining (KC) server as described herein). Although the operations are illustrated in a particular order, this order is exemplary and the operations shown can be performed in different orders, and can be combined and/or divided into operations having different functionality than shown in FIG. 20. Dashed lines indicate optional operations.

Furthermore, the exemplary method and/or procedure shown in FIG. 20 can be complementary to other exemplary methods and/or procedures disclosed herein, such that they are capable of being used cooperatively to provide the benefits, advantages, and/or solutions to problems described herein. For example, the exemplary method and/or procedure shown in FIG. 20 can be used with one or more of the exemplary methods and/or procedures shown in FIGS. 18, 19, and/or 21.

The exemplary method and/or procedure can include operations of block 2010, in which the KC server can receive, from the subscriber device, a request comprising a security identifier (ID) associated with the subscriber. In some embodiments, this can correspond to operation 1210 shown in FIG. 12 or operation 1510 shown in FIG. 15. In some embodiments, receiving the request can include receiving a first initialization request from the subscriber device; sending a response instructing the subscriber device to perform bootstrapping; and receiving, from the subscriber device, a further initialization request comprising the security ID. In some embodiments, these operations can correspond to various ones of operations 1110 to 1120 shown in FIG. 11 and operation 1210 shown in FIG. 12.

The exemplary method and/or procedure can include operations of block 2020, in which the KC server can, based on the security ID, establish an identity hierarchy comprising the plurality of entities associated with the subscriber. In some embodiments, establishing the identity hierarchy can also include receiving a list of entities, comprising any combination of devices and profiles, associated with the subscriber; and generating the identity hierarchy based on the list of entities. In some embodiments, these operations can correspond to various ones of operations 1270 to 1275 shown in FIG. 12 and operation 1570 to 1575 shown in FIG. 15. In some embodiments, the identity hierarchy further comprises one or more applications associated with each of the entities. In some embodiments, the identity hierarchy further comprises one or more time periods associated with at least a portion of the applications.

In some embodiments, establishing the identity hierarchy can also include sending a request for a second key of a plurality of keys derivable based on the security ID, wherein the request includes the security ID; receiving the second key and subscriber identity information; and authenticating the subscriber device based on the subscriber identity information. In some embodiments, these operations can correspond to various ones of operations 1220 to 1235 shown in FIG. 12 and operation 1520 to 1535 shown in FIG. 15.

In some embodiments, establishing the identity hierarchy can also include sending, to the authenticated subscriber device, a request for a first key of the plurality, wherein the request is encrypted using the second key; receiving, from the authenticated subscriber device, a response comprising the first key; and decrypting the response using the second key. In some embodiments, these operations can correspond to various ones of operations 1240 to 1250 shown in FIG. 12 or operation 1540 to 1550 shown in FIG. 15.

The exemplary method and/or procedure can include operations of block 2030, in which the KC server can generate a public key (PK) associated with the subscriber. In some embodiments, the PK can be generated based on the first key. In some embodiments, this can correspond to operations 1275 shown in FIG. 12.

The exemplary method and/or procedure can include operations of block 2040, in which the KC server can generate a hierarchy of secret keys (SKs) corresponding to the identity hierarchy. In some embodiments, the hierarchy of SKs comprises respective SKs for the one or more SPs to access data generated by the one or more applications associated with each of the entities. In some embodiments, the hierarchy of SKs comprises respective SKs for the one or more SPs to access data generated during the one or more time periods by the at least a portion of the applications.

In some embodiments, generating the hierarchy of SKs comprises receiving consents for one or more SPs to access data generated by the entities included in the identity hierarchy; and generating the hierarchy of SKs based on the consents and a master secret key (MSK). In some embodiments, these operations can correspond to various ones of operations 1370 to 1375 shown in FIG. 13 or operations 1470 to 1475 shown in FIG. 14.

The exemplary method and/or procedure can also include operations of block 2050, in which the KC server can send the hierarchy of SKs to a key management system (KMS) for storage. In some embodiments, these operations can correspond to operation 1390 shown in FIG. 13 or operations 1490 shown in FIG. 14.

The exemplary method and/or procedure can include operations of block 2060, in which the KC server can provide the PK to a particular device or profile included in the identity hierarchy. In some embodiments, providing the PK to a particular device or profile included in the identity hierarchy can include receiving a request for the PK from a first device, the request comprising the security ID; sending a request for a second key of a plurality of keys derivable based on the security ID, wherein the request includes the security ID; receiving the second key; and sending the PK to the first device, wherein the PK is encrypted using the second key. In some embodiments, these operations can correspond to operations 1650 to 1665 shown in FIG. 16. In some embodiments, the security ID comprises a bootstrap identifier (BTID); the request for the second key is sent to a bootstrapping server (BSF); and the second key is received from the BSF.

Figure 21:
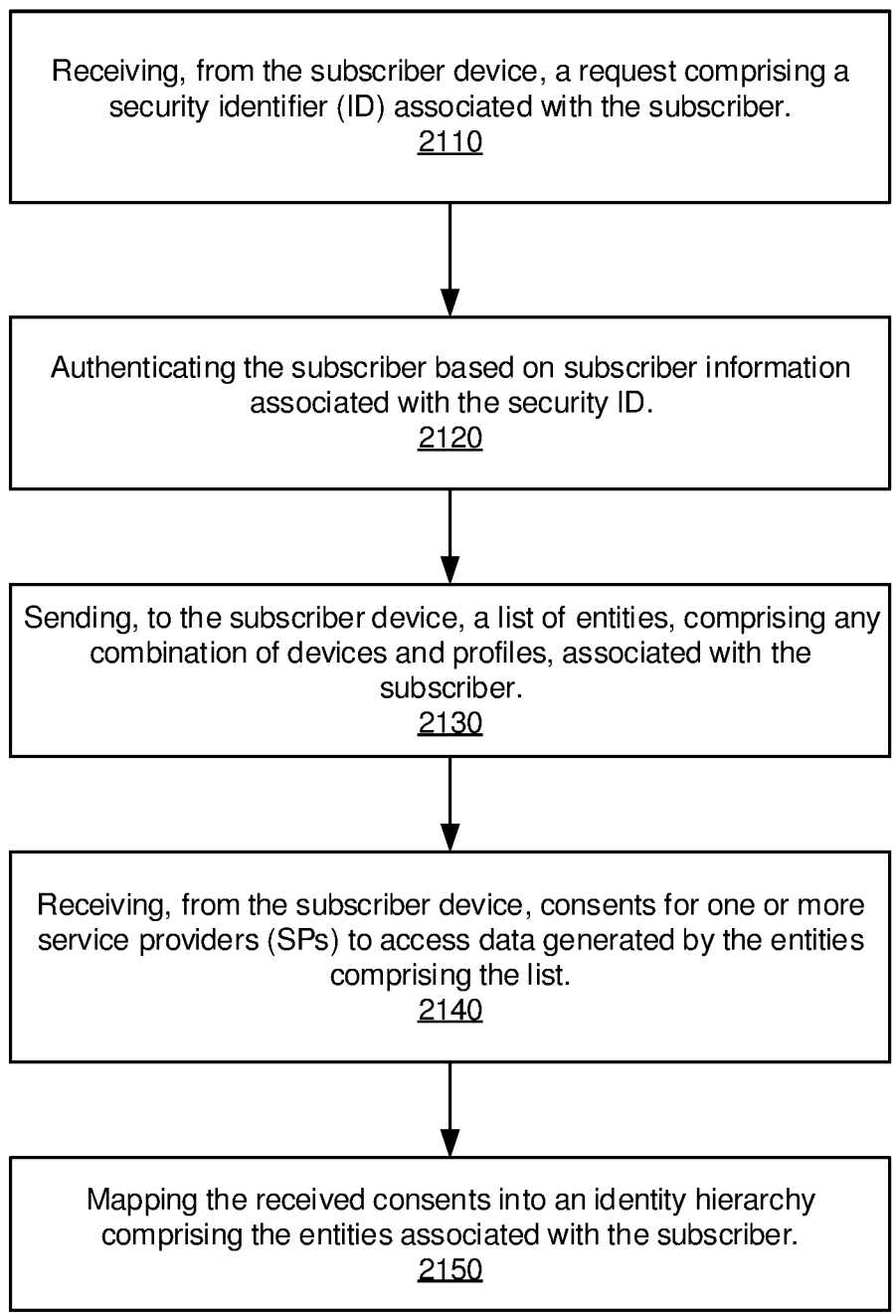

FIG. 21 shows a flow diagram of another exemplary method and/or procedure for facilitating secure communication between a subscriber to a mobile communication network and one or more service providers (SPs), wherein the subscriber is associated with a plurality of entities comprising any combination of devices and profiles, according to various exemplary embodiments of the present disclosure. For example, the exemplary method and/or procedure shown in FIG. 21 can be performed by a server (e.g., a context-aware service (CAS) server as described herein). Although the operations are illustrated in a particular order, this order is exemplary and the operations shown can be performed in different orders, and can be combined and/or divided into operations having different functionality than shown in FIG. 21. Dashed lines indicate optional operations.

Furthermore, the exemplary method and/or procedure shown in FIG. 21 can be complementary to other exemplary methods and/or procedures disclosed herein, such that they are capable of being used cooperatively to provide the benefits, advantages, and/or solutions to problems described herein. For example, the exemplary method and/or procedure shown in FIG. 21 can be used with one or more of the exemplary methods and/or procedures shown in FIGS. 18-20.

The exemplary method and/or procedure can include operations of block 2110, in which the CAS server can receive, from the subscriber device, a request comprising a security identifier (ID) associated with the subscriber. In some embodiments, this can correspond to operation 1310 shown in FIG. 13 or operation 1410 shown in FIG. 14.

The exemplary method and/or procedure can also include operations of block 2120, in which the CAS server can authenticate the subscriber based on subscriber information associated with the security ID. In some embodiments, authenticating the subscriber comprises sending a request for a second key derivable based on the security ID, wherein the request includes the security ID; receiving the second key and subscriber identity information; and authenticating the subscriber based on the subscriber identity information. In some embodiments, these operations can correspond to various ones of operations 1320 to 1335 shown in FIG. 13 or operation 1420 to 1435 shown in FIG. 14.

The exemplary method and/or procedure can also include operations of block 2130, in which the CAS server can send, to the subscriber device, a list of entities, comprising any combination of devices and profiles, associated with the subscriber. In some embodiments, the list of entities sent to the subscriber device is encrypted with the second key. In some embodiments, this can correspond to operation 1360 shown in FIG. 13 or operation 1460 shown in FIG. 14.

The exemplary method and/or procedure can also include operations of block 2140, in which the CAS server can receive, from the subscriber device, consents for one or more service providers (SPs) to access data generated by the entities included in the list. In some embodiments, this can correspond to operation 1370 shown in FIG. 13 or operation 1470 shown in FIG. 14. In some embodiments, the consents received from the subscriber device are decrypted using the second key.

The exemplary method and/or procedure can also include operations of block 2150, in which the CAS server can map the received consents into an identity hierarchy comprising the entities associated with the subscriber. In some embodiments, mapping the received consents further comprises mapping consents for the one or more SPs to access data generated by the one or more applications associated with each of the entities. In some embodiments, mapping the received consents further comprises mapping consents for the one or more SPs to access data generated during the one or more time periods by the at least a portion of the applications. In some embodiments, this can correspond to operation 1375 shown in FIG. 13.

Figure 22:
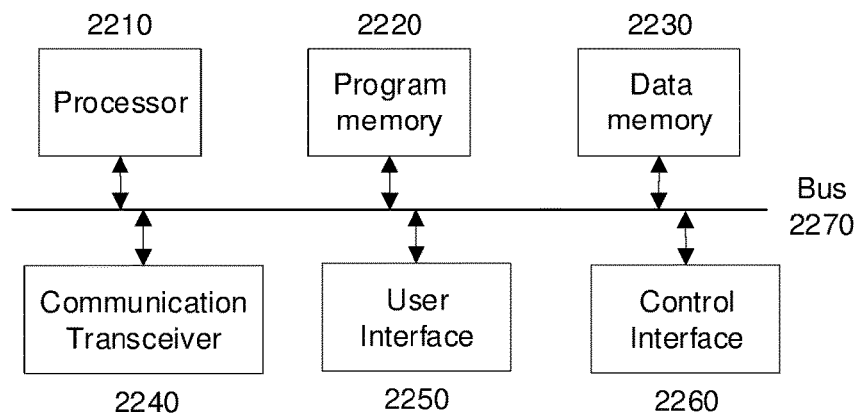
FIG. 22 is a high-level block diagram showing a subscriber device configurable to perform one or more exemplary methods and/or procedures disclosed herein.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 22 shows a block diagram of an exemplary subscriber device or user equipment (UE) configurable according to various exemplary embodiments of the present disclosure described herein. For example, the exemplary device shown in FIG. 22 can be configured to perform operations corresponding to those shown in the flow diagram of FIG. 18.

Exemplary device 2200 can comprise a processor 2210 that can be operably connected to a program memory 2220 and/or a data memory 2230 via a bus 2270 that can comprise parallel address and data buses, serial ports, or other methods and/or structures known to those of ordinary skill in the art. Program memory 2220 comprises software code or program executed by processor 2210 that facilitates, causes and/or programs exemplary device 2200 to communicate using one or more wired or wireless communication protocols, including one or more wireless communication protocols standardized by 3GPP, 3GPP2 (3rd Generation Partnership Project 2), or IEEE (Institute of Electrical and Electronics Engineers), such as those commonly known as 5G/NR (5G New Radio), LTE (Long Term Evolution), LTE-A (Long Term Evolution-Advanced), UMTS (Universal Mobile Telecommunications System), HSPA (High-Speed Packet Access), GSM (Global System for Mobile Communication), GPRS (General Packet Radio Services), EDGE (Enhanced Data rates for GSM Evolution), 1×RTT (One Times Radio Transmission Technology), CDMA (Code Division Multiple Access) 2000, 802.11 WiFi, HDMI (High Definition Multimedia Interface), USB (Universal Serial Bus), Firewire, etc., or any other current or future protocols that can be utilized in conjunction with communication transceiver 2240, user interface 2250, and/or host interface 2260.

For example, processor 2210 can execute program code stored in program memory 2220 that corresponds to MAC (Medium Access Control), RLC (Radio Link Control), PDCP (Packet Data Convergence Protocol), and RRC (Radio Resource Connection) layer protocols standardized by 3GPP (e.g., for NR and/or LTE). As a further example, processor 2210 can execute program code stored in program memory 2220 that, together with communication transceiver 2240, implements corresponding PHY (Physical) layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 2220 can also comprises software code executed by processor 2210 to control the functions of device 2200, including configuring and controlling various components such as communication transceiver 2240, user interface 2250, and/or host interface 2260. Program memory 2220 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML (HyperText Markup Language), XHTML (EXtensible HyperText Markup Language), machine code, and Assembler, as long as the desired functionality, e.g., as defined by the implemented method steps, is preserved. In addition or as an alternative, program memory 2220 can comprise an external storage arrangement (not shown) remote from device 2200, from which the instructions can be downloaded into program memory 2220 located within or removably coupled to device 2200, so as to enable execution of such instructions.

Data memory 2230 can comprise memory area for processor 2210 to store variables used in protocols, configuration, control, and other functions of device 2200, including operations corresponding to, or comprising, any of the exemplary methods and/or procedures described herein. Moreover, program memory 2220 and/or data memory 2230 can comprise non-volatile memory (e.g., flash memory), volatile memory (e.g., static or dynamic RAM (Random Access Memory)), or a combination thereof. Furthermore, data memory 2230 can comprise a memory slot by which removable memory cards in one or more formats (e.g., SD (Storage Device) Card, Memory Stick, Compact Flash, etc.) can be inserted and removed.

Persons of ordinary skill in the art will recognize that processor 2210 can comprise multiple individual processors (including, e.g., multi-core processors), each of which implements a portion of the functionality described above. In such cases, multiple individual processors can be commonly connected to program memory 2220 and data memory 2230 or individually connected to multiple individual program memories and or data memories. More generally, persons of ordinary skill in the art will recognize that various protocols and other functions of device 2200 can be implemented in many different computer arrangements comprising different combinations of hardware and software including, but not limited to, application processors, signal processors, general-purpose processors, multi-core processors, ASICs (Application-Specific Integrated Circuits), fixed and/or programmable digital circuitry, analog baseband circuitry, radio-frequency circuitry, software, firmware, and middleware.

Communication transceiver 2240 can comprise a radio-frequency transmitter and/or receiver functionality that facilitates the device 2200 to communicate with other equipment supporting like wireless communication standards and/or protocols. In some exemplary embodiments, communication transceiver 2240 includes a transmitter and a receiver that enable device 2200 to communicate with various 5G/NR networks according to various protocols and/or methods proposed for standardization by 3GPP and/or other standards bodies. For example, such functionality can operate cooperatively with processor 2210 to implement a PHY layer based on OFDM, OFDMA, and/or SC-FDMA technologies, such as described herein with respect to other figures.

In some exemplary embodiments, communication transceiver 2240 includes an LTE transmitter and receiver that can facilitate the device 2200 to communicate with various LTE LTE-Advanced (LTE-A), and/or NR networks according to standards promulgated by 3GPP. In some exemplary embodiments of the present disclosure, communication transceiver 2240 includes circuitry, firmware, etc. necessary for the device 2200 to communicate with various 5G/NR, LTE, LTE-A, UMTS (Universal Mobile Telecommunications System), and/or GSM/EDGE networks, also according to 3GPP standards. In some exemplary embodiments of the present disclosure, communication transceiver 2240 includes circuitry, firmware, etc. necessary for the device 2200 to communicate with various CDMA2000 networks, according to 3GPP2 standards.

In some exemplary embodiments of the present disclosure, communication transceiver 2240 is capable of communicating using radio technologies that operate in unlicensed frequency bands, such as IEEE 802.11 WiFi that operates using frequencies in the regions of 2.4, 5.6, and/or 60 GHz. In some exemplary embodiments of the present disclosure, communication transceiver 2240 can comprise a transceiver that is capable of wired communication, such as by using IEEE 802.3 Ethernet technology. The functionality particular to each of these embodiments can be coupled with or controlled by other circuitry in the device 2200, such as the processor 2210 executing program code stored in program memory 2220 in conjunction with, or supported by, data memory 2230.

User interface 2250 can take various forms depending on the particular embodiment of device 2200, or can be absent from device 2200 entirely. In some exemplary embodiments, user interface 2250 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, the device 2200 can comprise a tablet computing device including a larger touchscreen display. In such embodiments, one or more of the mechanical features of the user interface 2250 can be replaced by comparable or functionally equivalent virtual user interface features (e.g., virtual keypad, virtual buttons, etc.) implemented using the touchscreen display, as familiar to persons of ordinary skill in the art. In other embodiments, the device 2200 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 2200 having a touch screen display are capable of receiving user inputs, such as inputs related to exemplary methods and/or procedures described herein or otherwise known to persons of ordinary skill in the art.

A control interface 2260 of the device 2200 can take various forms depending on the particular exemplary embodiment of device 2200 and of the particular interface requirements of other devices that the device 2200 is intended to communicate with and/or control. For example, the control interface 2260 can comprise an RS-232 interface, an RS-485 interface, a USB interface, an HDMI interface, a Bluetooth interface, an IEEE ("Firewire") interface, an I²C (Inter-Integrated Circuit) interface, a PCMCIA (Personal Computer Memory Card International Association) interface, or the like. In some exemplary embodiments of the present disclosure, control interface 2260 can comprise an IEEE 802.3 Ethernet interface such as described above. In some exemplary embodiments of the present disclosure, the control interface 2260 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 2200 can comprise more functionality than is shown in FIG. 22 including, for example, a video and/or still-image camera, microphone, media player and/or recorder, etc. Moreover, communication transceiver 2240 can include circuitry necessary to communicate using additional radio-frequency communication standards including Bluetooth, GPS (Global Positioning System), and/or others. Moreover, the processor 2210 can execute software code stored in the program memory 2220 to control such additional functionality.

Figure 23:
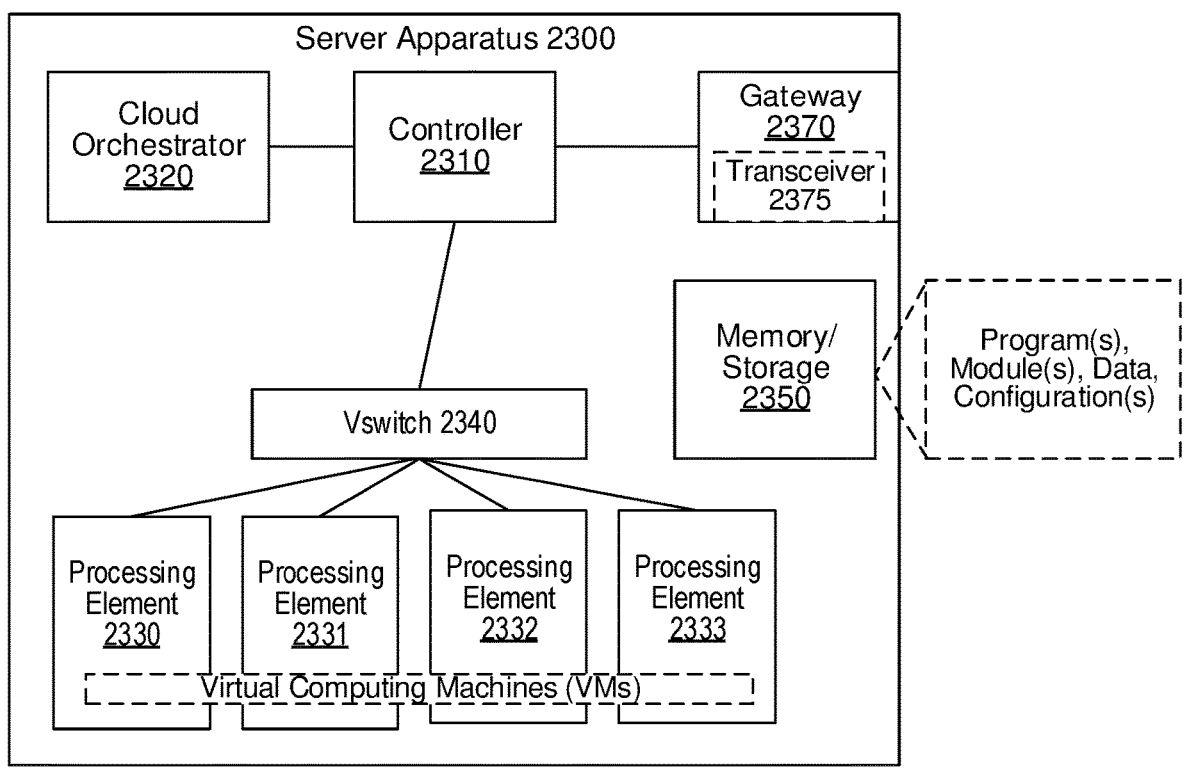
FIG. 23 is a high-level block diagram showing a server apparatus configured to perform one or more exemplary methods and/or procedures disclosed herein.

FIG. 23 is a block diagram of an exemplary server apparatus configurable according to one or more exemplary embodiments of the present disclosure. For example, apparatus 2300 can be configured to perform any of the exemplary methods and/or procedures described herein, such as those shown in FIGS. 19-21. Apparatus 2300 comprises a controller 2310 that is connected to a plurality of processing elements (PEs, or "processors") 2330-2333 via a virtual switch (Vswitch) 2340. Although four PEs and one Vswitch are shown, this is merely exemplary, and configurations involving more (or less) PEs and additional Vswitches can be employed advantageously. In some embodiments, PEs 2330-2333 can be configured as one or more virtual computing machines (VMs), the number of which can be the same as, or different than, the number of PEs 2330-2333.

Vswitch 2340 can also facilitate communications among the various PEs 2330-2333 (and/or the configured VMs) via local-area network (LAN) functionality, such as Ethernet. For example, when a new VM is initialized, cloud orchestrator 2320 can allocate a medium access control (MAC) address to this new VM. All subsequent communications to and from the VM can use this unique MAC address. An exemplary Cloud Orchestrator 2320 is OpenStack, in which the "Nova" component pre-determines MAC and Internet Protocol (IP) addresses of VMs in the DC (Dual Connectivity). Apparatus 2300 can communicate externally via one (or more) gateways, such as gateway 2370. For example, apparatus 2300 can communicate with a peer parallel computing apparatus via gateway 2370 and a compatible peer gateway. In some embodiments, gateway 2370 can comprise a communication transceiver 2375 (e.g., a Gigabit Ethernet transceiver, an optical transceiver, a radio transceiver, etc.)

Apparatus 2300 can comprise memory/storage 2350 that is operably connected to PEs 2330-2333 and controller 2310. Memory/storage 2350 can store various information including, e.g., program(s) and/or modules executable by PEs 2330-2333 and/or controller 2310. For example, memory/storage 2350 can store computer-executable instructions that, when executed, configure controller 2310 and/or PEs 2330-2333 to perform operations corresponding to any of the exemplary methods and/or procedures described above. As another example, memory/storage 2350 can comprise software code that can facilitate and specifically configure apparatus 2300 to communicate via gateway 2370 using appropriate protocols known to skilled persons.

A portion of memory/storage 2350 can also be used for permanent, semi-permanent, and/or temporary storage of data for further processing and/or communication by controller 2310 and/or PEs 2330-2333. Moreover, a portion of memory/storage 2350 can also be used for permanent, semi-permanent, and/or temporary storage of configuration(s) pertaining to controller 2310, PEs 2330-2333, and/or any other component of apparatus 2300. Persons of ordinary skill in the art will recognize that memory/storage 2350 can be configured in various ways with respect to controller 2310 and/or PEs 2330-2333. For example, multiple individual PEs can be commonly connected to memory/storage 2350, or individually connected to multiple individual memories comprising memory/storage 2350. More generally, persons of ordinary skill in the art will recognize that various protocols and other functions of apparatus 2300 can be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Figure 24:
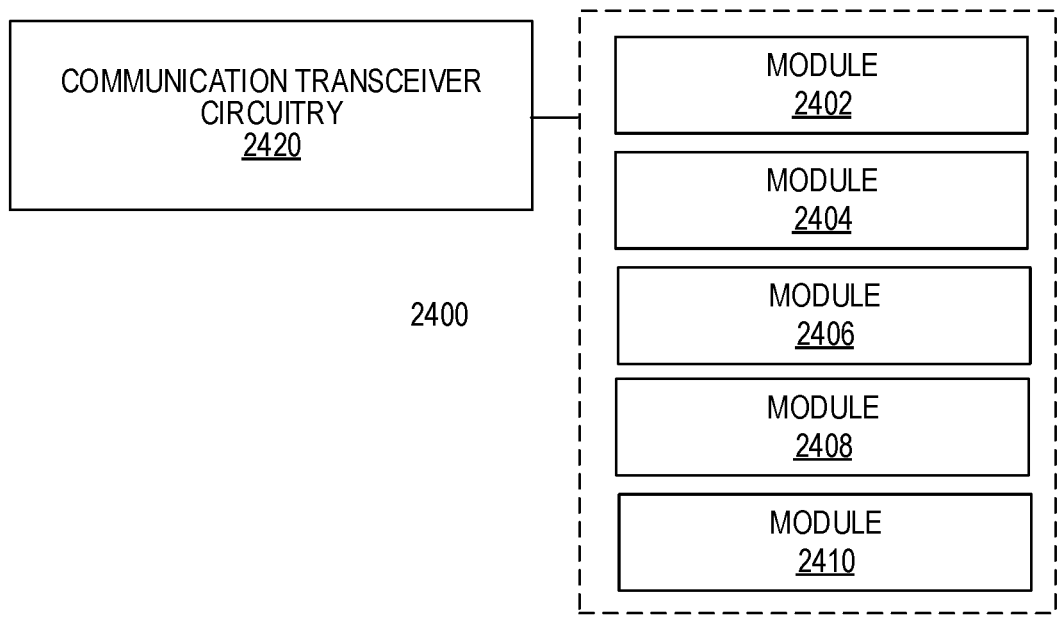
FIG. 24 illustrates an exemplary functional module or circuit architecture as can be implemented in an exemplary communication device, according to various exemplary embodiments of the present disclosure.

FIG. 24 illustrates an exemplary functional module or circuit architecture as can be implemented in an exemplary communication device 2400. For example, exemplary communication device 2400 can represent a substantially similar device as exemplary device 2200 shown in FIG. 22, albeit configured in a different manner according to various functional modules. As shown in FIG. 24, device 2400 can include communication transceiver circuitry 2420, which in some embodiments can be substantially similar to communication transceiver 2240 of device 2200. In other embodiments, transceiver circuitry 2420 can have more, less, or different features than the features of transceiver 2240.

In addition, device 2400 can include a plurality of functional modules, labelled 2402-2410 respectively in FIG. 24. Although five modules are shown, this is merely exemplary such that device 2400 can be configured with a greater or lesser number of modules. In various embodiments, each of modules 2402-2410 can comprise different combinations of analog and/or digital hardware, one or more processors, and/or memory storing computer-executable instructions (e.g., executable by the one or more processors). Furthermore, the hardware and/or software comprising a particular module need not be mutually exclusive, such that different modules can utilize the same hardware and/or software (e.g., in a time-shared manner).

Regardless of the particular combination, each module can be configured to perform one or more particular functions or operations. For example, each module can be configured to perform a particular operation corresponding to one (or more) of the operations shown in or described above in relation to FIG. 18. As a more specific example, each of modules 2402-2410 can be configured to perform a respective one of operations 1810-1850 shown in FIG. 18. As noted above, other modules can be included in device 2400 to perform additional, or different, operations.

Figure 25:
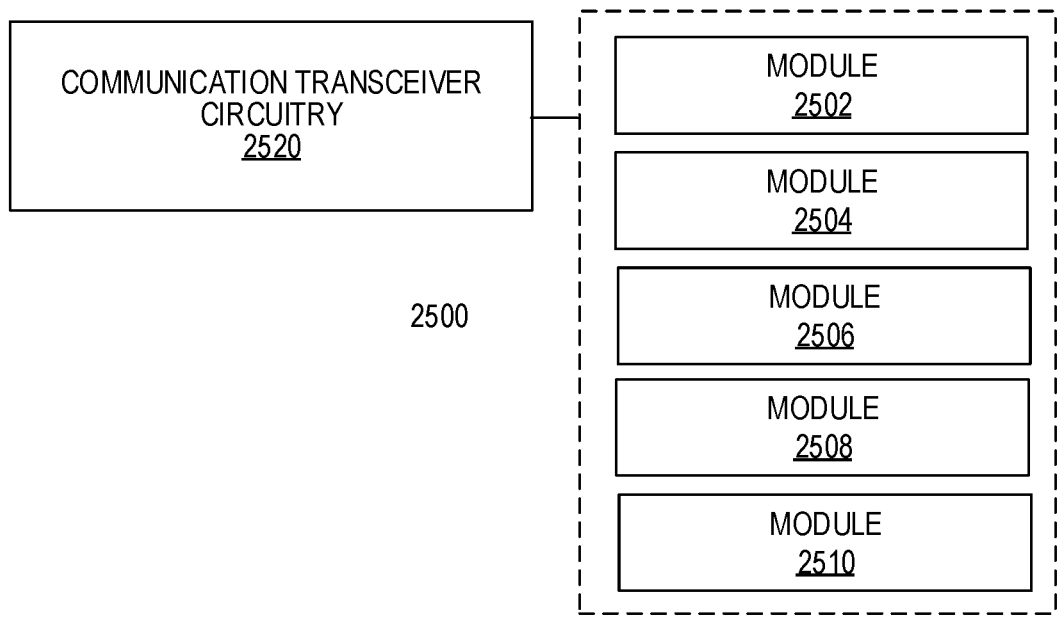
FIG. 25 illustrates an exemplary functional module or circuit architecture as can be implemented in an exemplary server device, according to various exemplary embodiments of the present disclosure.

FIG. 25 illustrates an exemplary functional module or circuit architecture as can be implemented in an exemplary server device 2500. For example, server device 2500 can represent a substantially similar device as exemplary server device 2300 shown in FIG. 23, albeit configured in a different manner according to various functional modules. As shown in FIG. 25, server device 2500 can include communication transceiver circuitry 2520, which in some embodiments can be substantially similar to communication transceiver 2375 comprising gateway 2370 of server device 2300. In other embodiments, transceiver circuitry 2520 can have more, less, or different features than the features of communication transceiver 2375.

In addition, device 2500 can include a plurality of functional modules, labelled 2502-2510 respectively in FIG. 25. Although five modules are shown, this is merely exemplary such that device 2500 can be configured with a greater or lesser number of modules. In various embodiments, each of modules 2502-2510 can comprise different combinations of analog and/or digital hardware, one or more processors, and/or memory storing computer-executable instructions (e.g., executable by the one or more processors). Furthermore, the hardware and/or software comprising a particular module need not be mutually exclusive, such that different modules can utilize the same hardware and/or software (e.g., in a time-shared manner).

Regardless of the particular combination, each module can be configured to perform one or more particular functions or operations. For example, each module can be configured to perform a particular operation corresponding to one (or more) of the operations shown in or described above in relation to FIGS. 19-21. As a more specific example, each of modules 2502-2510 can be configured to perform a respective one of operations 1910-1950 shown in FIG. 19. As noted above, other modules can be included in device 2500 to perform additional operations, such as operations 1960-1980 shown in FIG. 19.

As another example, each of modules 2502-2510 can be configured to perform a respective one of operations 2010-2050 shown in FIG. 20, and an additional module (e.g., a module 2512) can be included to perform operation 2060. As yet another example, each of modules 2502-2510 can be configured to perform a respective one of operations 2110-2150 shown in FIG. 21.

Notably, modifications and other embodiments of the disclosed embodiments will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

References cited herein include:

[1] Ericsson mobility report.
[2] EU general data protection regulation.
[3] FTC privacy and data security.

[4] Personal data protection.
[5] Advantages and disadvantages of certificate authentication.
[6] A. Jancic and M. Warren, "Pki—advantages and obstacles." pp. 104-114, 01-2004.
[7] M. Sethi, P. Kortoi, M. D. Francesco, and T. Aura, "Secure and lowpower authentication for resource-constrained devices," in 2015 5th International Conference on the Internet of Things (IOT), October 2015, pp. 30-36.
[8] J. Ring, K.-K. R. Choo, E. Foo, and M. Looi, "A new authentication mechanism and key agreement protocol for sip using identity-based cryptography," 2006.
[9] M. Shanmugam, S. Thiruvengadam, A. Khurat, and I. Maglogiannis, "Enabling secure mobile access for electronic health care applications," in 2006 Pervasive Health Conference and Workshops, November 2006, pp. 1-8.
[10] Y. Targali, V. Choyi, and Y. Shah, "Seamless authentication across heterogeneous networks using generic bootstrapping systems," in 2013 9th International Wireless Communications and Mobile Computing Conference (IWCMC), July 2013, pp. 137-142.
[11] D. van Thanh, T. Jonvik, B. Feng, D. van Thuan, and I. Jorstad, "Simple strong authentication for internet applications using mobile phones," in IEEE GLOBECOM 2008-2008 IEEE Global Telecommunications Conference, November 2008, pp. 1-5.
[12] J. A. MacDonald, "Authentication considerations for mobile ehealth applications," in 2008 Second International Conference on Pervasive Computing Technologies for Healthcare, January 2008, pp. 64-67.
[13] C. Doukas, I. Maglogiannis, V. Koufi, F. Malamateniou, and G. Vassilacopoulos, "Enabling data protection through pki encryption in IoT m-health devices," in Bioinformatics & Bioengineering (BIBE), 2012 IEEE 12th International Conference on. IEEE, 2012, pp. 25-29.
[14] J. Horwitz and B. Lynn, "Toward hierarchical identity-based encryption," in Advances in Cryptology—EUROCRYPT 2002, L. R. Knudsen, Ed. Berlin, Heidelberg: Springer Berlin Heidelberg, 2002, pp. 466-481.
[15] C. Gentry and A. Silverberg, "Hierarchical id-based cryptography," in Advances in Cryptology—ASIACRYPT 2002, Y. Zheng, Ed. Berlin, Heidelberg: Springer Berlin Heidelberg, 2002, pp. 548-566.
[16] D. Boneh, X. Boyen, and E.-J. Goh, "Hierarchical identity-based encryption with constant size ciphertext," in Advances in Cryptology—EUROCRYPT 2005, R. Cramer, Ed. Berlin, Heidelberg: Springer Berlin Heidelberg, 2005, pp. 440-456.
[17] Q. Xing, B. Wang, X. Wang, P. Chen, B. Yu, Y. Tang, and X. Gao, "Unbounded revocable hierarchical identity-based encryption with adaptive-id security," in 2016 IEEE 18th International Conference on High Performance Computing and Communications; IEEE 14th International Conference on Smart City; IEEE 2nd International Conference on Data Science and Systems (HPCC/SmartCity/DSS), December 2016, pp. 430-437.
[18] M. Mahmoody and A. Mohammed, "On the power of hierarchical identity-based encryption," in Advances in Cryptology—EUROCRYPT 2016, M. Fischlin and J.-S. Coron, Eds. Berlin, Heidelberg: Springer Berlin Heidelberg, 2016, pp. 243-272.
[19] R. M. Daniel, E. B. Rajsingh, and S. Silas, "Analysis of hierarchical identity-based encryption schemes and its applicability to computing environments," Journal of Information Security and Applications, vol. 36, pp. 20-31, 2017.
[20] C. B. Gentry and A. Silverberg, "Hierarchical identity-based encryption and signature schemes," 2008, U.S. Pat. No. 7,349,538.
[21] J. W. Weber, "Hierarchical encryption key system for securing digital media," Jan. 20 2009, U.S. Pat. No. 7,480,385.
[22] V. Goyal, O. Pandey, A. Sahai, and B. Waters, "Attribute-based encryption for fine-grained access control of encrypted data," in Proceedings of the 13th ACM conference on Computer and communications security. Acm, 2006, pp. 89-98.
[23] A. Lewko and B. Waters, "Unbounded hibe and attribute-based encryption," in Annual International Conference on the Theory and Applications of Cryptographic Techniques. Springer, 2011, pp. 547-567.
[24] D. Boneh and X. Boyen, "Efficient selective-id secure identity-based encryption without random oracles," in Advances in Cryptology—EUROCRYPT 2004, C. Cachin and J. L. Camenisch, Eds. Berlin, Heidelberg: Springer Berlin Heidelberg, 2004, pp. 223-238.

What is claimed is:

1. A method, performed by a subscriber device, for facilitating secure communication between a subscriber to a mobile communication network and one or more service providers (SPs), the method comprising:
   obtaining a security identifier (ID) associated with the subscriber;
   based on the security ID, establishing an identity hierarchy comprising a plurality of entities that include any combination of devices and profiles associated with the subscriber;
   based on the security ID, establishing consents for one or more SPs to access data generated by the entities in the identity hierarchy;
   in response to a first request comprising the security ID, receiving a public key (PK) usable to encrypt the generated data for sending to a particular SP, wherein the encrypted data is decryptable using a corresponding secret key (SK) associated with an established consent for the particular SP; and
   encrypting the generated data using the PK and the identity hierarchy.

2. The method of claim 1, wherein:
   the identity hierarchy further comprises one or more applications associated with each of the entities in the identity hierarchy; and
   establishing consents further comprises establishing consents for the one or more SPs to access data generated by the one or more applications associated with each of the entities in the identity hierarchy.

3. The method of claim 2, wherein:
   the identity hierarchy further comprises one or more time periods associated with at least a portion of the applications; and
   establishing consents further comprises establishing consents for the one or more SPs to access data generated during the one or more time periods by the at least a portion of the applications.

4. The method of claim 1, wherein:
   the security ID comprises a bootstrap identifier (BTID); and
   obtaining the security ID comprises performing an authentication key agreement (AKA) with a bootstrapping server (BSF) and receiving the BTID, wherein performing the AKA with the BSF comprises:
      sending a bootstrap request to the BSF;
      receiving an authenticate challenge from the BSF;

sending an authentication response to the BSF; and
receiving the BTID.

5. The method of claim 1, wherein establishing the identity hierarchy comprises:
sending an initialization request comprising the security ID, wherein the initialization request is encrypted using a second key derivable based on the security ID;
receiving a request for a first key derivable based on the security ID;
decrypting the initialization request using the second key; and
sending a response comprising the first key, wherein the response is encrypted using the second key.

6. The method of claim 1, wherein establishing consents for one or more SPs comprises:
sending a second request comprising the security ID, wherein the second request is encrypted using a third key derivable based on the security ID;
receiving a list of entities including any combination of devices and profiles associated with the subscriber;
decrypting the list of entities using the third key;
associating consents, for each of the one or more SPs, with the entities of the list; and
sending a response comprising the consents, wherein the response is encrypted using the third key.

7. The method of claim 1, wherein receiving the PK usable to encrypt data for sending to a particular SP comprises:
sending a second request for the PK, wherein the second request comprises the security ID and is encrypted using a second key derivable based on the security ID;
receiving a response comprising the PK; and
decrypting the response using the second key.

8. The method of claim 1, further comprising sending the generated data, encrypted by the PK, to the SP in association with the security ID, wherein the encrypted data and the security ID are further encrypted by a fourth key derivable based on the security ID.

9. A subscriber device configured to facilitate secure communication between a subscriber to a mobile communication network and one or more service providers (SPs), the subscriber device comprising:
a communication transceiver;
at least one processor operatively coupled to the communication transceiver; and
at least one memory storing computer-executable instructions that, when executed by the at least one processor, configure the subscriber device to perform operations corresponding to the method of claim 1.

10. A method, performed by a server, for facilitating secure communication between a subscriber to a mobile communication network and one or more service providers (SPs), the method comprising:
receiving, from a subscriber device, a first request comprising a security identifier (ID) associated with the subscriber;
based on the security ID, establishing an identity hierarchy comprising a plurality of entities that include any combination of devices and profiles associated with the subscriber;
generating a public key (PK) associated with the subscriber;
generating a hierarchy of secret keys (SKs) corresponding to the identity hierarchy; and
providing the PK to a particular device or profile in the identity hierarchy.

11. The method of claim 10, further comprising sending the hierarchy of SKs to a key management system (KMS) for storage.

12. The method of claim 10, wherein:
the identity hierarchy further comprises one or more applications associated with each of the entities in the identity hierarchy; and
the hierarchy of SKs comprises respective SKs for the one or more SPs to access data generated by the one or more applications associated with each of the entities in the identity hierarchy.

13. The method of claim 12, wherein:
the identity hierarchy further comprises one or more time periods associated with at least a portion of the applications; and
the hierarchy of SKs comprises respective SKs for the one or more SPs to access data generated during the one or more time periods by the at least a portion of the applications.

14. The method of claim 10, wherein establishing the identity hierarchy comprises:
sending a second request for a second key of a plurality of keys derivable based on the security ID, wherein the second request includes the security ID;
receiving the second key and subscriber identity information; and
authenticating the subscriber device based on the subscriber identity information.

15. The method of claim 14, wherein establishing the identity hierarchy further comprises:
sending, to the authenticated subscriber device, a third request for a first key of the plurality of keys, wherein the third request is encrypted using the second key;
receiving, from the authenticated subscriber device, a response comprising the first key; and
decrypting the response using the second key, wherein the PK is generated based on the first key.

16. The method of claim 10, wherein establishing the identity hierarchy further comprises:
receiving a list of entities including any combination of devices and profiles associated with the subscriber; and
generating the identity hierarchy based on the list of entities.

17. The method of claim 10, wherein generating the hierarchy of SKs comprises:
receiving consents for one or more SPs to access data generated by the entities in the identity hierarchy; and
generating the hierarchy of SKs based on the consents and a master secret key (MSK).

18. The method of claim 10, wherein receiving the request comprises:
receiving a first initialization request from the subscriber device;
sending a response instructing the subscriber device to perform bootstrapping; and
receiving, from the subscriber device, a further initialization request comprising the security ID.

19. The method of claim 10, wherein providing the PK to a particular device or profile included in the identity hierarchy comprises:
receiving a second request for the PK from a first device, the second request comprising the security ID;
sending a request for a second key of a plurality of keys derivable based on the security ID, wherein the request for the second key includes the security ID;
receiving the second key; and sending the PK to the first device, wherein the PK is encrypted using the second key.

20. The method of claim 19, wherein:
the security ID comprises a bootstrap identifier (BTID);
the request for the second key is sent to a bootstrapping server (BSF); and
the second key is received from the BSF.

21. A server apparatus configured to facilitate secure communication between a subscriber to a mobile communication network and one or more service providers (SPs), the server apparatus comprising:
a communication transceiver;
at least one processor operatively coupled to the communication transceiver; and
at least one memory storing computer-executable instructions that, when executed by the at least one processor, configure the server apparatus to perform operations corresponding to the method of claim 10.

22. A method, performed by a server, for facilitating secure communication between a subscriber to a mobile communication network and one or more service providers (SPs), the method comprising:
receiving, from a subscriber device, a request comprising a security identifier (ID) associated with the subscriber;
authenticating the subscriber based on subscriber information associated with the security ID;
sending, to the subscriber device, a list of entities including any combination of devices and profiles associated with the subscriber;
receiving, from the subscriber device, consents for one or more service providers (SPs) to access data generated by the entities in the list; and
mapping the received consents into an identity hierarchy that comprises the entities associated with the subscriber.

23. The method of claim 22, wherein:
the identity hierarchy further comprises one or more applications associated with each of the entities in the identity hierarchy; and
mapping the received consents further comprises mapping consents for the one or more SPs to access data generated by the one or more applications associated with each of the entities in the identity hierarchy.

24. The method of claim 23, wherein:
the identity hierarchy further comprises one or more time periods associated with at least a portion of the applications; and
mapping the received consents further comprises mapping consents for the one or more SPs to access data generated during the one or more time periods by the at least a portion of the applications.

25. The method of claim 24, wherein authenticating the subscriber comprises:
sending a request for a second key derivable based on the security ID, wherein the request for the second key includes the security ID;
receiving the second key and subscriber identity information; and
authenticating the subscriber based on the subscriber identity information.

26. The method of claim 25, wherein:
one or more of a first set of conditions and a second set of conditions applies;
the first set of conditions includes:
the list of entities sent to the subscriber device is encrypted with the second key, and
the consents received from the subscriber device are decrypted using the second key; and
the second set of conditions includes:
the security ID comprises a bootstrap identifier (BTID),
the request for the second key is sent to a bootstrapping server (BSF), and
the second key and subscriber identity information are received from the BSF.

27. A server apparatus configured to facilitate secure communication between a subscriber to a mobile communication network and one or more service providers (SPs), the server apparatus comprising:
a communication transceiver;
at least one processor operatively coupled to the communication transceiver; and
at least one memory storing computer-executable instructions that, when executed by the at least one processor, configure the server apparatus to perform operations corresponding to the method of claim 22.

* * * * *